US009709005B2

(12) United States Patent
Pendray

(10) Patent No.: US 9,709,005 B2
(45) Date of Patent: Jul. 18, 2017

(54) AIR ASSISTED INJECTOR FOR WET COMPRESSION ATOMIZATION

(71) Applicant: Cummins Power Generation IP, Inc., Minneapolis, MN (US)

(72) Inventor: John Robert Pendray, Blaine, MN (US)

(73) Assignee: CUMMINS POWER GENERATION IP, INC., Minneapolis, MN (US)

( * ) Notice: Subject to any disclaimer, the term of this patent is extended or adjusted under 35 U.S.C. 154(b) by 73 days.

(21) Appl. No.: 14/625,078

(22) Filed: Feb. 18, 2015

(65) Prior Publication Data

US 2016/0237974 A1 Aug. 18, 2016

(51) Int. Cl.
*F02M 25/028* (2006.01)
*F02M 69/08* (2006.01)

(52) U.S. Cl.
CPC .......... *F02M 25/028* (2013.01); *F02M 69/08* (2013.01)

(58) Field of Classification Search
CPC ....... F02M 35/10177; F02M 35/10216; F02M 39/00; F02M 55/00; F02M 69/04; F02M 69/041; F02M 69/08; F02M 69/461; F02M 67/02
USPC ....... 123/295, 296, 394, 305, 445, 470, 490, 123/531, 533; 239/533.2, 533.3
See application file for complete search history.

(56) References Cited

U.S. PATENT DOCUMENTS 2,554,612 A 5/1951 Bills et al.
3,911,871 A 10/1975 Williams et al.
4,459,943 A 7/1984 Goodman
4,934,329 A 6/1990 Lear et al.
5,400,746 A 3/1995 Susa et al.
(Continued)

FOREIGN PATENT DOCUMENTS

EP 1 856 392 11/2007
WO WO-2006/079172 8/2006

OTHER PUBLICATIONS

Anthony J. Liberatore, EAA Experimenter—Spark-Ignited Heavy Fuel, Part Deux, http://www.eaa.ca/experimenter.articles/2009-12_fuel.asp, accessed on Aug. 20, 2014.
(Continued)

*Primary Examiner* — John Kwon
*Assistant Examiner* — Johnny H Hoang
(74) *Attorney, Agent, or Firm* — Foley & Lardner LLP

(57) ABSTRACT

An apparatus comprises an internal combustion engine including an intake stream, at least one piston cylinder. An air assisted injector is configured to insert a plurality of liquid droplets into the intake stream or cylinder. The injector comprises a gas injection portion configured to deliver a gas to a mixing chamber at a first pressure and a first pulse width. A liquid injection portion is configured to deliver a liquid to the mixing chamber at a first temperature and a second pulse width, and after a predetermined delay relative to the gas so as to generate the plurality of liquid droplets having a mean diameter of up to 5 microns. A nozzle is configured to deliver the plurality of liquid droplets into the intake chamber or cylinder. The gas and the inserted liquid droplets are compressed during a compression stroke in the cylinder and fully vaporize throughout the compression stroke.

25 Claims, 17 Drawing Sheets

(56) References Cited

U.S. PATENT DOCUMENTS

| | | | | |
|---|---|---|---|---|
| 5,884,611 | A * | 3/1999 | Tarr | F02M 67/12 123/531 |
| 6,161,516 | A * | 12/2000 | Rigazzi | F02B 17/00 123/261 |
| 6,213,104 | B1 * | 4/2001 | Ishikiriyama | F02B 51/00 123/27 GE |
| 2003/0140873 | A1 | 7/2003 | Lee | |
| 2006/0266307 | A1 | 11/2006 | Mezheritsky et al. | |
| 2010/0077986 | A1 | 4/2010 | Chen | |
| 2010/0326399 | A1 | 12/2010 | Pendray | |
| 2014/0251278 | A1 * | 9/2014 | de Boer | F02M 31/02 123/472 |
| 2014/0360460 | A1 * | 12/2014 | Peters | F02M 27/08 123/294 |

OTHER PUBLICATIONS

Geoffrey Cathcart, Development of Lightweight 2-Stroke & 4-Stroke Heavy Fuel UAV Engines, Orbital Corporation, accessed on Aug. 20, 2014.

Jon-Russell J. Groenewegen, The Performance and Emissions Characteristics of Heavy Fuels in a Small, Spark Ignition Engine, Thesis Submitted to the School of Engineering of the University of Dayton, in Partial Fulfillment of the Requirements for the Degree of Master of Science in Mechanical Engineering, dated Dec. 2011.

International Search Report and Written Opinion for PCT/U.S. 2016/017944, Issued Apr. 19, 2016, 10 pages.

* cited by examiner

AIR ASSISTED INJECTOR FOR WET COMPRESSION ATOMIZATION

TECHNICAL FIELD

The present disclosure relates generally to thermal management of internal combustion (IC) engines.

BACKGROUND

Engine knocking (also referred to as detonation, spark knocking or pinging) occurs in internal combustion engines when a portion of an air-fuel mixture in an engine cylinder does not combust with the rest of the air-fuel mixture in the cylinder at the precise time in a piston's stroke cycle. These create peripheral explosions which can be heard by a user. Knocking can limit the compression ratio, ignition timing, and other engine parameters that effect efficiency of IC engines.

A contributing factor to knocking is engine cylinder temperature. Too high a temperature of the engine cylinder can auto-ignite a portion of the air-fuel mixture before a combustion stroke causing knocking. One way of preventing knocking is to cool the cylinder of the engine to prevent auto ignition of the fuel (e.g., diesel fuel communicated into the engine).

Liquids can be used to cool the engine cylinder. Conventional methods of cooling IC engines include humid air and water injection, which are related processes. Humid air cycles were used in reciprocating engines and gas turbines to reduce NOx emissions. Humid air involves inserting steam or any other non-reactive vapor into the air-fuel stream communicated to the cylinder. Vapor injection increases the thermal mass of the air-fuel mixture and dilutes the charge air. The dilution decreases the tendency of to knock while maintaining stoichiometric combustion. The larger thermal mass reduces the peak temperatures in the combustion chamber therefore reducing NOx formation.

Because humid air is already in a vapor phase when mixed with the air-fuel stream, it cannot go through a phase change during compression. When humid air is compressed, the temperature increases almost as fast as if the air were dry. The temperature rises slightly lower since the specific heat ratio of the vapor e.g., water, is often lower than the specific heat ratio of the air/fuel mixture. Any improved knock margin is primarily dependent upon the dilution effect.

In water injection, large liquid droplets are added to an air-fuel stream to provide cooling from the phase change from liquid to gaseous state. The phase change occurs during each of the compression stroke and the combustion stroke in a cylinder of the piston. Having liquid droplets during the combustion phase can provide cooling but can reduce the efficiency of combustion. Upon insertion, the water droplets can follow one of two paths: collision with internal surfaces of the cylinder or entrainment in the airflow.

Large droplets may collide with internal surfaces of the cylinder during airflow direction changes. The inertia of large water droplets can overwhelm the friction from surrounding airflow and hinder the droplets ability to follow air flow changes around structures within air ducting, intake manifold, and cylinder causing droplet collision with the internal surfaces. If the surface is hot such as in the cylinder, a portion of the droplets may vaporize and cause some cooling by the phase change. Most of the droplets, however, do not vaporize during the compression stroke and are pushed by the airflow along the internal surface. As the liquid moves, it may coalesce with other liquid droplets.

During such coalescing, the ratio of surface area to volume of the liquid decreases, which reduces the effects of air temperature on liquid vaporization. Surface wetting by the liquid droplets may also lead to corrosion which can cause cylinder liner scuffing and oil quality degradation.

If the droplets do not collide with a solid surface, they may remain in the airflow. Eventually, at least some of the droplets may arrive in the cylinder. During compression, the air temperature surrounding the droplets increases. Increased temperature causes heat to flow from the air to the water droplet. As the thermal gradient between the droplet and surrounding air increases, the heat transfer rate increases. Heat transfer across the large thermal gradients associated with large droplets increases system entropy reducing cycle efficiency.

Large droplets, for example having a mean diameter of greater than about 20 microns, have enough thermal inertia to remain in liquid form during combustion. Large droplets have a lower surface area to volume ratio than small droplets. Because heat transfer depends upon surface area and heat required for total vaporization depends upon volume, large droplets may not have enough time to completely vaporize. When the large droplets are present during combustion, they lower peak cylinder pressures and temperatures and slow flame propagation which decreases system efficiency. While water injection and humid air injection may have some ability to reduce engine knock, various shortcomings persist including entropy increase from large thermal gradients required during liquid vaporization, corrosion from surface wetting and undesired cooling of the combustion process.

SUMMARY

Embodiments described herein relate generally to thermal management of IC engines and, in particular, to wet compression using droplets having a diameter of up to 5 microns which are generated by air assisted injection.

In some embodiments, an apparatus comprises an internal combustion engine including an intake stream, at least one piston and at least one cylinder. An air assisted injector is configured to insert a plurality of liquid droplets into the intake stream or the combustion chamber of the engine. The air assisted injector comprises a gas injection portion configured to deliver a gas to a mixing chamber included in the air assisted injector at a first pressure and a first pulse width. The air assisted injector also comprises a liquid injection portion configured to deliver a liquid to the mixing chamber at a first temperature and a second pulse width. The liquid is delivered to the mixing chamber after a predetermine delay relative to the gas so as to generate the plurality of liquid droplets which have a mean diameter of up to 5 microns. The air assisted injector also includes a nozzle configured to deliver the plurality of liquid droplets to the intake chamber of the at least one cylinder. The gas and the inserted liquid droplets are compressed during a compression stroke in the at least one cylinder such that, the compression causes the inserted liquid droplets to fully vaporize throughout the compression stroke in the at least one cylinder.

In other embodiments, an apparatus comprises an internal combustion engine including an intake stream, at least one piston and at least one cylinder. An air assisted injector is configured to insert a plurality of liquid droplets into the intake stream and the cylinder of the engine. The air assisted injector comprises a gas injection portion configured to deliver a gas to a mixing chamber included in the air assisted injector at a first pressure and a first pulse width. The air assisted injector also includes a liquid injection portion configured to deliver a liquid to the mixing chamber at a first temperature and a second pulse width. The liquid is delivered to the mixing chamber after a predetermine delay relative to the gas to generate the plurality of liquid droplets having a mean diameter of up to about 5 microns.

Moreover, the air assisted injector also includes a nozzle configured to deliver the plurality of liquid droplets to the at least one of the intake chamber and the cylinder. The gas and the inserted liquid droplets are compressed during a compression stroke in the at least one cylinder. A controller is electrically coupled to at least one of the air assisted injector and the engine. The controller is configured to determine an amount of the liquid droplets which is to be inserted into the cylinder based on an operating condition of the engine such that the amount of inserted liquid droplets is determined to fully vaporize throughout the compression stroke of the at least one cylinder.

In yet another embodiment, a method of generating liquid droplets for wet compression in an engine is provided. The method involves the use of an air assisted injector which includes a liquid injection portion, a gas injection portion, a mixing chamber, and a nozzle. The method comprises operating an internal combustion engine with at least one piston and at least one cylinder. A gas is delivered via the gas injection portion to the mixing chamber at a first pressure and a first pulse width. A liquid is delivered via the liquid injection portion to the mixing chamber at a second pulse width after a predetermined delay. A plurality of liquid droplets are generated which have a mean diameter of up to 5 microns. The plurality of liquid droplets are communicated to the at least one cylinder. The plurality of liquid droplets are compressed in the cylinder which causes the liquid droplets to fully vaporize during the compressing within the cylinder.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
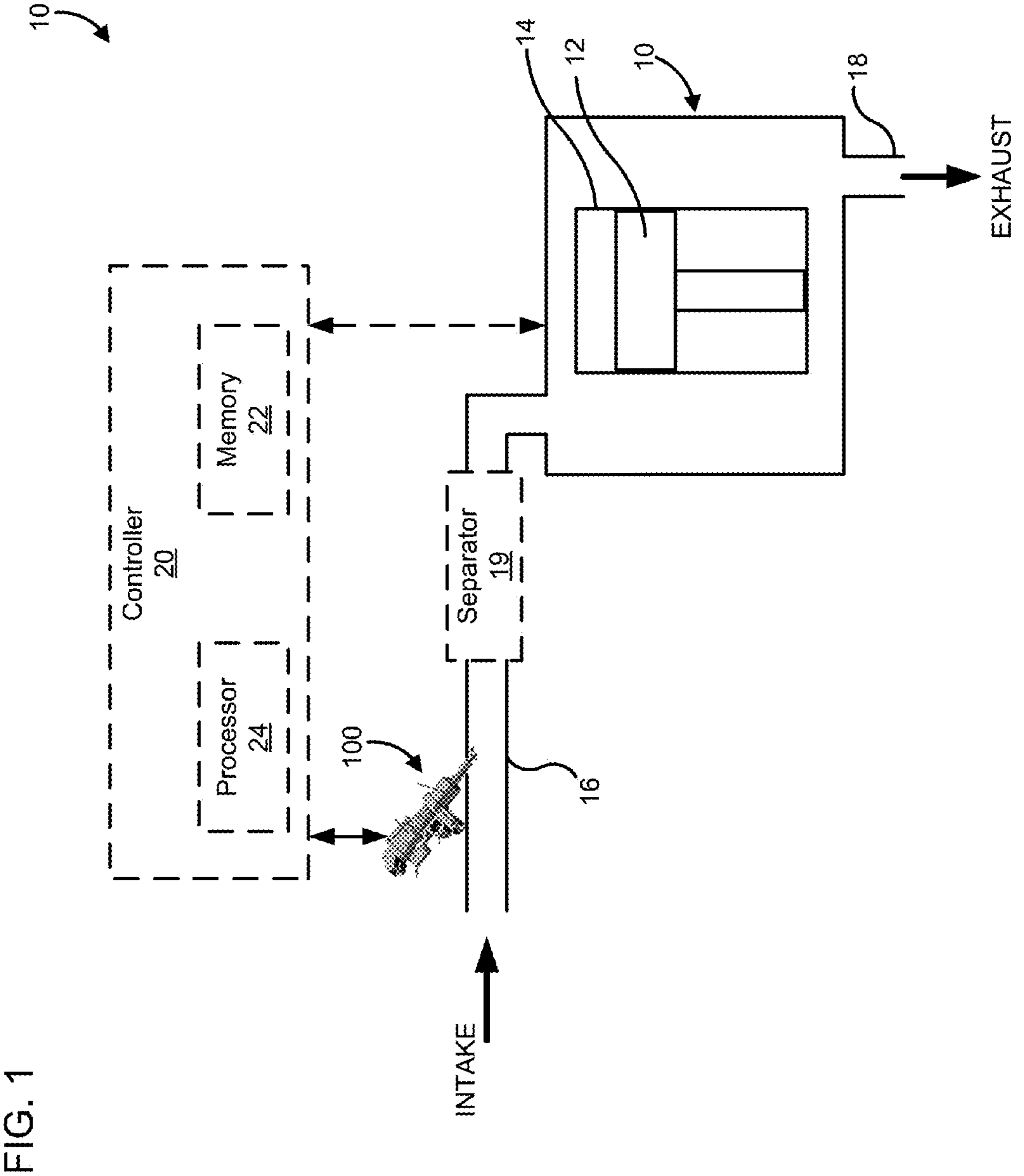
FIG. 1 is a schematic block diagram of an embodiment of an apparatus that includes an engine and an air assisted injector to insert liquid droplets into an intake stream of the engine such that the liquid droplets have a mean diameter of up to 5 microns.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to thermal management of IC engines and, in particular, to wet compression using liquid droplets having a diameter of up to 5 microns which are generated by air assisted injection.

Embodiments described herein provide several benefits including, for example, (1) providing cooling of engine cylinder by fully vaporizing a plurality of liquid droplets within the cylinder during a compression stroke of the cylinder, the phase change providing substantially more cooling than humid air cooling; (2) providing liquid droplets having a diameter of up to 5 microns which provide a large surface area such that the liquid droplets completely vaporize and provide a large surface area for heat transfer; (3) using an existing air assisted injector for achieving the liquid droplets having a diameter of up to 5 microns which is significantly smaller than a diameter of liquid droplets that the air assisted injector produces during regular operation; (4) providing cooling while preventing corrosion which can occur if the liquid droplets remain in liquid form as is the case in water injection; and (5) improving power output and efficiency of the engine.

As described herein, the term "wet compression" refers to the compression of a suspension or mixture of liquid droplets suspended or otherwise entrained in a gas in a cylinder of an engine such that the liquid droplets fully vaporize during a compression stroke of the cylinder. In other words, substantially all of the liquid droplets change phase from a liquid phase to a gaseous phase during the compression stroke. As used herein, the term "substantially all of the liquid droplets" refers to greater than 99% by mass of the liquid droplets implying that greater than 99% by mass of the liquid droplets experience the phase change during the compression stroke.

Expanding further, wet compression alters the isentropic or polytropic index of compression by adding a plurality of liquid droplets suspended in a gas into engine cylinders during a compression stroke. The liquid droplets have a sufficiently large surface area to maintain a low thermal gradient during a phase change from a liquid phase to a gaseous phase throughout the compression stroke and optionally, also the intake stroke. The smaller the droplets of the liquid, the larger the surface area of the liquid available to attain a phase change. Particularly, liquid droplets having a diameter of up to 5 microns provide a sufficiently large surface area to completely vaporize during the compression stroke. In this manner, the droplets can act as an intercooler during the compression stroke to reduce peak charge air temperature, and cylinder wall temperature thereby, reducing knocking.

In wet compression, a suspension of a plurality of liquid droplets in air is inserted into the intake air or directly into the engine cylinder such that the droplets remain in liquid form during the insertion. The droplets then fully vaporize or otherwise experience a phase change from the liquid to the gaseous state during the compression stroke of the cylinder to provide cooling. The plurality of liquid droplets provide uniform cooling avoiding hot spots.

For wet compression conditions during air intake, smaller droplets (e.g., having a diameter less than about 5 microns) contribute to improve dispersion in the charge air. For a similar volume of liquid, the separation between droplets is less with smaller diameter droplets, and correspondingly provides more cooling points and keeps the bulk temperature closer to a saturation temperature. Moreover, small droplets avoid contact with surfaces and substantially vaporize before the combustion process begins, which can increase the efficiency of the engine.

The entrained droplets in the intake air improve the volumetric efficiency of an IC engine. Under normal operating conditions as the engine draws air into the cylinder, the fresh air mixes with residual exhaust gas and typically is heated by the cylinder walls, piston, and head. This heating causes the gas to expand, thus reducing the amount of air introduced to the cylinder in each cycle. Under wet compression conditions, the entrained droplets keep the charge air cool, which increases the charge air density which may contribute to increased power density.

Insertion of liquid droplets into the cylinder during the compression stroke of the engine may increase system entropy. Heat flows from the compressing air and the increased pressure cause the plurality of liquid to vaporize. This heat transfer is driven by a thermal gradient. Heat transfer across a thermal gradient increases entropy, and the larger the thermal gradient, the more entropy is produced. The smaller the diameter of a liquid droplet, the larger the surface area relative to the volume of the droplet, which increases the amount of heat transfer. The larger heat transfer of the smaller diameter liquid droplets (e.g., having a diameter less than about 5 microns) generated by the apparatus and methods described herein provide a reduced entropy level and result in improved efficiency of the engine.

Thus, wet compression is different from "water injection" as described herein, because, in water injection, a majority of the liquid droplets remain in liquid phase during and after the compression stroke of the engine. These liquid droplets continue into the combustion stroke of the engine which may affect the efficiency and performance of the engine. In such instances, the thermal gradient tends to be large for the heat transfer, since the combustion temperature is high while the liquid is still at its saturation temperature.

Combustion temperatures may remain high before vaporizing the liquid (e.g., water), allowing elevated NOx formation. Further, when droplets carry into the combustion stage, the phase transformation tends to cool the combustion process. Wet combustion may decrease system efficiency due to a lower temperature and therefore a decreased pressure rise compared to dry combustion, as well as slower flame propagation. In contrast, in wet compression substantially all of the liquid droplets vaporize during the compression stroke before combustion, which improves NOx emissions and efficiency.

Different parameters can affect the amount of vaporization of the plurality of liquid droplets during the compression stroke. Droplet diameter is one parameter for vaporization properties. For a given quantity of water for one embodiment, the time required for droplet vaporization is partially dependent upon the diameter of the droplet squared. At a constant thermal gradient relative to the bulk gas temperature, the time to vaporize a liquid droplet scales approximately quadratically with the droplet diameter. With a similar thermal gradient, a 5 micron droplet will likely vaporize in approximately 1/16th the time of a 20 micron droplet and a 1 micron droplet will likely vaporize in approximately 1/400th the time because of the surface to volume ratio and dispersion effects of smaller droplets.

Contrary to wet compression, water injection generally uses large droplets of water, for example from 20 microns to over 100 microns in diameter, and is intended to cool the combustion by a combination of vaporization and air-fuel dilution. The large droplets however, provide limited cooling during the compression stroke and most of the cooling is provided during combustion stroke In contrast, embodiments of the methods described herein produce smaller droplets having a diameter of up to 5 microns. These smaller liquid droplets allow faster vaporization, acting as an inter-cooler for the compression stroke and fully vaporizing before combustion. While the inter-cooling effect may be more efficient, the effect may also utilize less water to provide a similar knock margin and NOx reduction. Less water is utilized since inter-cooling contributes to reduced compression work, therefore requiring less energy dissipation.

The fast vaporization rate of the smaller liquid droplets (e.g., having a diameter of up to 5 microns) also tends to reduce corrosion and oil-loss sometimes associated with water injection. Small droplets can potentially vaporize in less than a millisecond when exposed to large thermal gradients. Thus if a small droplet is on a trajectory toward the cylinder wall, the heat from the cylinder will likely vaporize the droplet before it is able to contact a cylinder surface. A larger droplet would take longer to vaporize, and may enable liquid-solid contact. Small diameter liquid droplets are better able to follow airflows effectively as compared to large liquid droplets, thus making port injection schemes possible as an alternative to direct injection.

Typically, it is desired that droplets follow airflow to avoid wetting internal surfaces. Larger droplets, common to water injection systems, are more likely to collide with engine surfaces. Surface wetting decreases compression inter-cooling effectiveness and may cause corrosion issues. Droplets that collide with internal surfaces decrease their ratio of surface area to volume thereby reducing the available surface for heat transfer. Liquids on internal surfaces of the cylinder may also become a source for possible corrosion or lubricant removal. As the surface area to volume ratio of the droplets increases, so does the droplet trajectory's dependence upon the surrounding airflow.

As the droplet temperature increases from heat flow, the droplet reaches its saturation temperature and vaporizes. The heat used to create this vaporization would otherwise be used to increase the temperature of the compressing air, thus droplet vaporization may effectively reduce compression temperature, suppressing knock. During compression the pressure also increases, thus the saturation temperature increases throughout the compression stroke. Vaporization adds to the total number of gas molecules in the compression chamber, thus it also adds to the total chamber pressure. This allows the isentropic or polytropic index of compression for temperature to be lower than the effective isentropic or polytropic index of compression for pressure.

FIG. 1 is schematic block diagram of an apparatus 100 that includes an air assisted injector for producing a plurality of liquid droplets having a diameter of up to 5 microns. The apparatus 100 includes an engine 10, an intake stream 16, an air assisted injector 110, and optionally, a separator 19, and a controller 20.

The engine 10 includes an IC engine and includes at least one piston 12 disposed in at least one cylinder 14. In some embodiments, the engine 10 can be a four stroke engine. In one embodiment, the engine 10 can include a diesel powered engine with fuel injection and compression ignition. In other embodiments, the engine 10 can be a four stroke spark ignition engine, a two stroke engine or a rotary type engine (e.g., a Wankel rotary engine) and may or may not include fuel injection. In such embodiments, the engine may be powered by gasoline, ethanol, natural gas, kerosene oil, liquid petroleum gas, hydrogen, propane, any other suitable fuel source or a combination thereof (e.g., a gasoline-ethanol mixture). While shown as including a single piston-cylinder set, the engine 10 can include any number of piston-cylinder sets, for example, 2, 4, 6, 8, 10, 12 or even more.

The intake stream 16 is fluidly coupled to the engine 10 and is configured to deliver an air-fuel mixture to the cylinder 14 for compression and combustion within the cylinder 14. The engine 10 also includes an exhaust 18 to expel exhaust gas (e.g., a diesel exhaust gas). The air assisted injector 110 is in fluidic communication with the intake stream 16 and is configured to insert a plurality of liquid droplets into the intake stream 16. In some embodiments, at least a portion of the air assisted injector 110 can be disposed within the engine 10 and configured to insert the plurality of liquid droplets directly within the cylinder 14 of the engine 10.

Figure 2:
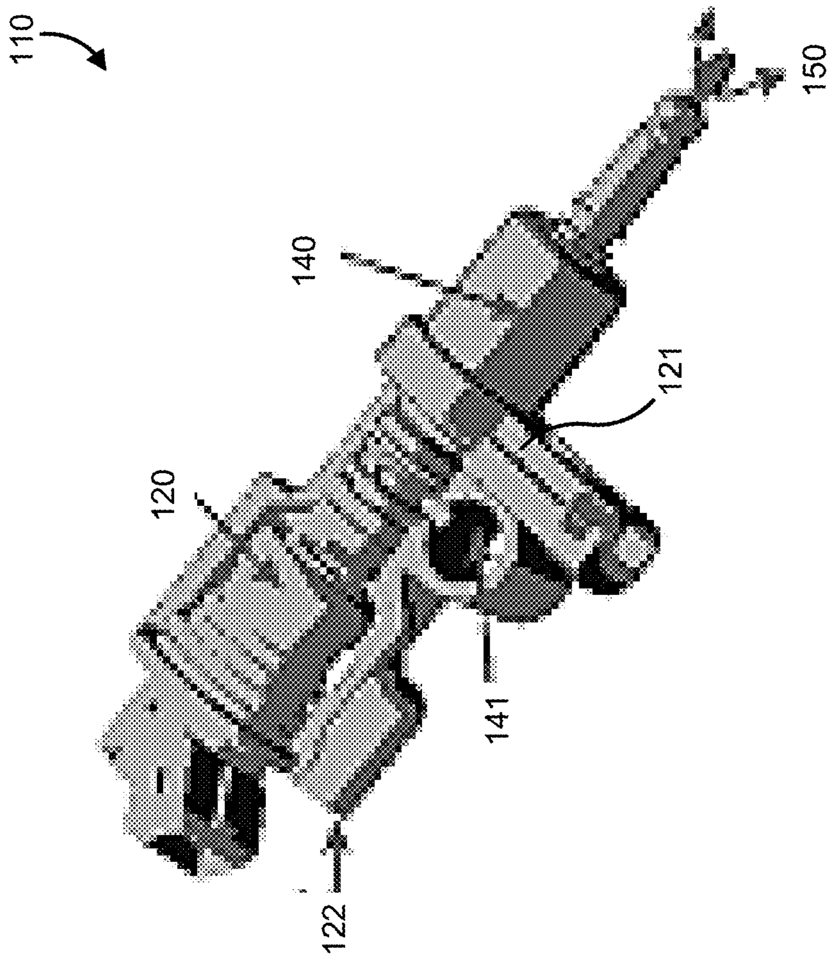
FIG. 2 is a perspective view of the air assisted injector included in the apparatus of FIG. 1.
Figure 3:
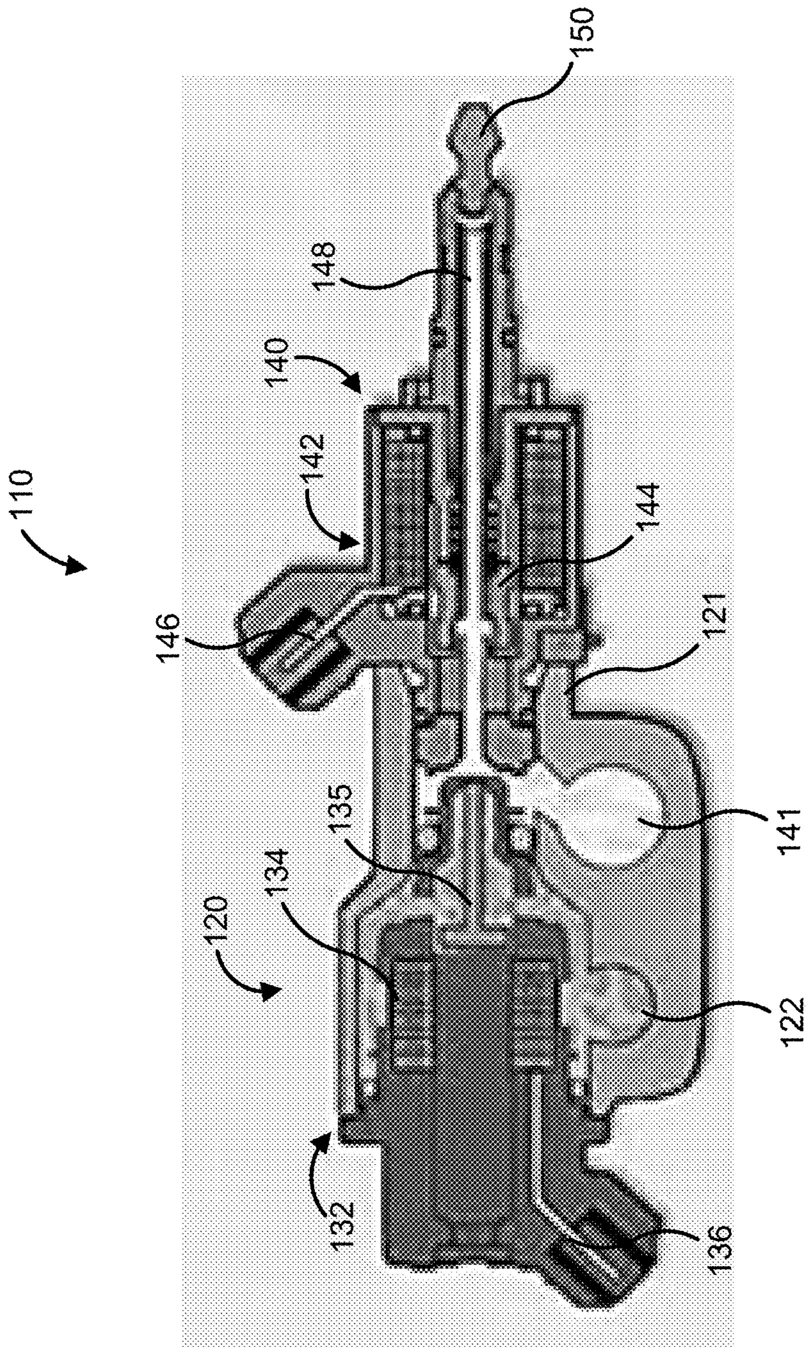
FIG. 3 is a side cross-section view of the air assisted injector of FIG. 2.

FIG. 2 shows an enlarged view of the air assisted injector 110, and FIG. 3 shows a side cross-section view of the air assisted injector 110. The air assisted injector 110 includes housing 121 within which the components of the air assisted injector 110 are disposed. The air assisted injector 110 includes a gas injection portion 140 configured to deliver a gas to a mixing chamber 148 of the air assisted injector 110 at a first pressure and a first pulse width. The gas injection portion 140 includes a first inlet 141 for receiving a gas. The gas can consist of or comprise air, oxygen, natural gas, propane, hydrogen, any other gas and combinations thereof.

The gas injection portion 140 also includes a first actuation mechanism 142 for delivering the first pulse width. The first actuation mechanism 142 includes a solenoid actuated first valve 144 which is activated by an electrical signal communicated by a first communication lead 146. In a particular embodiment, the first communication lead 146 can be in electrical communication with the controller 20 which can control the actuation of the first actuation mechanism 142.

In some embodiments, the first pulse width is 10 milliseconds to 25 milliseconds (e.g., 10 milliseconds, 15 milliseconds, 20 milliseconds or 25 milliseconds, inclusive of all ranges and values therebetween). This correlates to a mass of the gas delivered per pulse width of 22.5 mg per pulse width (also referred to herein as "shot" or "cycle") to 70.8 mg per pulse width inclusive of all ranges and values therebetween. Furthermore, the first pressure can be in the range of 650 kPa to about 2,000 kPa (e.g., 650 kPa, 700 kPa, 750 kPa, 800 kPa, 850 kPa, 900 kPa, 950 kPa, 1,000 kPa, 1,050 kPa, 1,100 kPa, 1,150 kPa, 1,200 kPa, 1,300 kPa, 1,400 kPa, 1,500 kPa, 1,600 kPa, 1,700 kPa, 1,800 kPa, 1,900 kPa or 2,000 kPa inclusive of all ranges and values therebetween).

The air assisted injector 110 also includes a liquid injection portion 120 configured to deliver a liquid to the mixing chamber 148 at a first temperature and a second pulse width. The liquid injection portion 120 includes a second inlet 122 through which the liquid is communicated into the liquid injection portion 120. The liquid injection portion 120 includes a second actuation mechanism 132 for delivering the second pulse width. The second actuation mechanism 132 can also include a solenoid actuated valve 134 which is activated by an electrical signal communicated by a second communication lead 136. In some embodiments, the second communication lead 136 can be in electrical communication with the controller 20 which can control the actuation of the second actuation mechanism 132. The second actuation mechanism 132 includes a solenoid actuated second valve 135 for delivering the second pulse width.

The liquid can include water, ethanol, a hydrocarbon, or mixtures thereof, for example a water-ethanol mixture. In one embodiment, the liquid can include a source of engine-safe water. In some embodiments, the liquid can include water provided from an existing component or sub-systems of a system that includes the engine 10. Such sub-systems can include but are not limited to stationary primary power such as combined heat and power systems (CHP), exhaust gas recirculation (EGR) system, and exhaust water recovery systems similar to those used in fuel cells. CHP systems are generally connected to water supplies, and adding components, such as water purifiers, generally will not significantly add to the system size. EGR cooling systems provide for the uncontrolled introduction of water to the engine after precipitation in the cooler. Alternatively, condensation from EGR coolers may be collected and communicated to the air assisted injector 110 for producing the plurality of liquid droplets, as described herein.

In one embodiment, cooled EGR water from an exhaust gas condenser may serve as an adequate liquid source. Alternatively or additionally, external water may be used with filtering and/or distilling as desired. Because there is already significant heating and cooling taking place in engines, integrated distillation systems may be a cost effective approach to providing clean water. In particular embodiments, liquid droplets may be recycled in cooled EGR applications, for example, where large water droplets are present in the air-fuel stream and may provide a majority of the water for the air assisted injector 110, which reduces the need for external water supplies. Water may also be recycled from the exhaust gas independent of other exhaust systems such as an EGR cooler.

In one embodiment, the first temperature can be in the range of 25 degrees Celsius to 90 degrees Celsius (e.g., about 25 degrees Celsius, 30 degrees Celsius, 40 degrees Celsius, 50 degrees Celsius, 60 degrees Celsius, 70 degrees Celsius, 80 degrees Celsius, or 90 degrees Celsius, inclusive of all ranges and values therebetween). In another embodiment, the second pulse width can be in the range of 3.0 milliseconds to 10 milliseconds to deliver a mass of liquid in the range of 25 mg per pulse width to 105 mg per pulse width inclusive of all ranges and values therebetween. In a particular embodiment, the second pulse width is 8.5 milliseconds configured to deliver a mass of liquid in the range of 80 mg per pulse width to 90 mg per pulse width (e.g., 85 mg per pulse width).

The liquid is delivered to the mixing chamber 148 after a predetermined delay relative to the gas so as to generate liquid droplets having a mean diameter of up to 5 microns. In other words, the gas stream is initiated and then the liquid stream is started after the predetermined delay. In particular embodiments, the predetermined delay can be in the range of 0 milliseconds to 12 milliseconds (e.g., 0 milliseconds, 1 milliseconds, 2 milliseconds, 3 milliseconds, 4 milliseconds, 5 milliseconds, 6 milliseconds, 7 milliseconds, 8 milliseconds, 9 milliseconds, 10 milliseconds, 11 milliseconds or 12 milliseconds, inclusive of all ranges and values therebetween).

In still other embodiments, a ratio of the gas to the liquid is in the range of 0.25 to 2.5, inclusive of all ranges and values therebetween. For example, the second pulse width can be in 8.5 milliseconds to deliver a mass of liquid of 85 mg per pulse width and the first pulse width of the gas can be varied between 10 milliseconds to 25 milliseconds to obtain the desired gas to liquid ratio.

In some embodiments, a surfactant can also be included in the liquid to facilitate the production of the plurality of liquid droplets having a diameter of up to 5 microns. The amount of the surfactant in the liquid can be 0.01% by volume to 0.1% by volume (e.g., 0.01%, 0.02%, 0.04%, 0.06%, 0.08% or 0.1% by volume inclusive of all ranges and values therebetween). Suitable surfactants can include Triton (e.g., Triton X-100®), ethanol, methanol, glycerols, glucosides, etc.

The air assisted injector 110 includes a nozzle 150 configured to deliver the plurality of liquid droplets to the intake stream 16 or to the cylinder 14. In one embodiment, in which the air assisted injector 110 delivers the plurality of liquid droplets to the intake stream 16, a separator 19 can be disposed in the intake stream downstream of the air assisted injector 110. The separator 19 is configured to remove droplets larger than 5 microns which might be produced by the air assisted injector, for example due to abnormal operation. In particular embodiments, the separator 19 can be integrated with the engine 10 or the air assisted injector 110.

It should be noted that the air assisted injector 110 can include a commercially available air assisted injector that is configured to generate a plurality of liquid droplets having a diameter of greater than 20 microns. However, by defining a first pulse width and first pressure of the gas as described herein, as well as delivering the liquid after the predetermined delay to the mixing chamber 148, the air assisted injector is caused to generate the plurality of liquid droplets that have a diameter of up to 5 microns. Furthermore, any liquid can be used with the air assisted injector including water, diesel, gasoline, and ethanol.

The air assisted injector described herein is easily integrated with existing engines and using the methods defined herein, provides higher control over the size of the liquid droplets. For example, in particular embodiments, the air assisted injector 110 can be a fuel injector of the engine 10. The air assisted injector 110 can be used to deliver the plurality of liquid droplets to the cylinder 14 during the compression stroke so that the liquid droplets fully vaporize in the cylinder 14 throughout the compression stroke. The same air assisted injector 110 can then also be used to deliver the air-fuel mixture for combustion. In such embodiments, the liquid can include the fuel (e.g., diesel, gasoline, ethanol, etc.).

In further embodiments, the apparatus 100 can optionally include the controller 20. The controller 20 can be electrically coupled to at least one of the air assisted injector 110 and the engine 10. The controller 20 is configured to determine an amount of liquid droplets which is to be inserted into the cylinder 14 based on an operating condition of the engine 10 such that the amount of liquid droplets fully vaporize throughout the compression stroke of the cylinder 14. In other words, the controller 20 can meter the amount of the liquid droplets to be inserted into the intake stream 16 or directly into the cylinder 14 (e.g., by varying the first pulse width, the second pulse width, or the first pressure) based on the operating condition of the engine 10 (e.g., steady state, low load, high load, etc.).

Since the temperature of the engine 10 can be different for different operating conditions, the metering ensures that the liquid droplets fully vaporize in the cylinder 14 irrespective of the operating condition of the engine 10. In some embodiments, the controller 20 can also be configured to control engine 10 operating limit. The operating limit can be determined in response to a set of auto-ignition conditions and the amount of liquid droplets to be inserted (also referred to herein as "wet compression level") is based on a set of engine 10 operating conditions which change with each engine cycle.

In further embodiments, the controller 20 can be configured to adjust an isentropic index of compression of the engine 10 by a means for detecting a knock level of the engine 10. The controller 20 can then determine the wet compression level in response to the knock level of the engine 10 exceeding a knock threshold. Calculating the wet compression level may include determining an amount of liquid droplets to be inserted, and determining a duration for which the liquid droplets are inserted into the cylinder 14

(e.g., by controlling the second pulse width). In still other embodiments, the controller 20 can also be configured to adjust an index of compression of the engine 10 as well as adjusting the wet compression level in response to an engine 10 operating limit.

In some embodiments, the controller 20 may be included in a standard type of Engine Control Module (ECM). The controller 20 includes a memory 22 and a processor 24. The controller 20 can be an electronic circuit comprised of one or more components, including digital circuitry, analog circuitry, or both. Controller 20 may be a software and/or firmware programmable type, for example a hardwired, dedicated state machine, or a combination of these.

In one embodiment, the controller 20 is a programmable microcontroller solid-state integrated circuit that integrally includes one or more processing units 24 and the memory 22. The memory 22 may be comprised of one or more components and may be of any volatile or nonvolatile type, including the solid state variety, the optical media variety, the magnetic variety, a combination of these, or such different arrangement as would occur to those skilled in the art. Further, while only one processor 24 is shown, the controller 20 can include a multiplicity of processors 24. When multiple processors 24 are present, the controller 20 may be arranged to distribute processing among such units, and/or to provide for parallel or pipelined processing if desired. The controller 20 can operate in accordance with operating logic defined by programming, hardware, or a combination of these.

In another embodiment, the memory 22 is configured to store programming instructions executable by the processing unit 24 of the controller 20 to embody at least a portion of an operating logic (e.g., controlling the amount of liquid droplets inserted based on engine operation). Alternatively or additionally, the memory 22 stores data that is manipulated by the operating logic of the controller 20. The controller 20 may include signal conditioners, signal format converters (such as analog to digital and digital-to-analog converters), limiters, clamps, filters, and the like as needed to perform various control and regulation operations described in the present application. The controller 20 receives various inputs and generates various outputs to perform various operations as described herein for controlling the operation of the air assisted injector.

Separation of large droplets can prevent large droplets from being present during combustion and also increases liquid use efficiency by enabling liquid recycling. For example, a 100 micron diameter droplet that is captured and recycled can produce 200,000 five micron diameter droplets which would have 2,000 times the total surface area significant for cooling. Separation can be performed using any suitable separator such as an inertial separator, a screen separator, a gravitational separator or an electrostatic separator.

The plurality of liquid droplets are communicated into the cylinder 14 via the intake stream 16 or inserted directly into the cylinder 14. The gas and the inserted liquid droplets are compressed during a compression stroke in the cylinder 16. The compression causes the inserted liquid droplets to fully vaporize throughout the compression stroke within the cylinder 16. In other words, the all (or substantially all) of the liquid droplets undergo a phase change from liquid to gaseous phase during the compression stroke. In this way, wet compression provides significant cooling to the engine 10 to improve performance and engine efficiency, and reduce knocking, as described in detail herebefore.

As described herein, injection of the plurality of liquid droplets by the air assisted injector 110 may be in the intake stream 16 or directly in the cylinder 14. Within the cylinder 14, the plurality of liquid droplets can be injected during the intake stroke or just after the intake valve closes. Both external injection in the intake stream 16 or internal injection in the cylinder 14 before the intake stroke improve volumetric efficiency by cooling the intake charge air, thus increasing its density. Internal injection after the intake valve closes provides greater cooling for a similar amount of liquid injection due to a smaller air mass. Internal injection enables injection timing optimization that minimizes internal surface wetting by injecting at a rate similar to the vaporization rate. Matching injection and vaporization rates minimizes the residence time of water droplets in the cylinder 14. While internal injection provides greater control, having the air assisted injector in the intake stream 16 is generally less expensive.

In addition to improving efficiency, wet compression enables greater engine control. The pre-ignition temperature may be controlled by adjusting the duration of wet compression. The duration of wet compression may be set by the amount of liquid droplets added to the intake air that is inserted into the cylinder 14. The control of wet compression ratio may enable rapid control of pre-ignition temperatures and pressures.

Pre-ignition temperature control provides many of the same benefits as variable compression ratio engines. As the fuel quality, air-fuel ratio, or inlet air conditions change, the knocking characteristics of the engine 10 change. Wet compression may enable the engine 10 to adapt to these changes on a cycle by cycle basis. Homogeneous charge compression ignition (HCCI) is one application that requires control over air-fuel conditions at or near top dead center. Well controlled wet compression may enable the engine to adapt to auto-ignition changes due to fuel or charge air changes. As charge air conditions change in one cycle, the injector may adjust the amount of liquid injected in the next cycle to maintain robust HCCI. Well controlled wet compression may provide the benefits of a variable compression ratio engine, but with the possibility of controlling and optimizing each engine cycle and cylinder separately.

Because the air-fuel mixture is cooled during compression, the pressure increase may be lower than it would be without cooling provided by wet compression. Although the compression ratio may be relatively high, the pressure ratio and temperature ratio for the start of compression relative to the end of compression is lower than the temperature and pressure ratios for the expansion stroke. This difference in pressure and temperature ratios makes the inter-cooling by wet compression operate in a manner similar to miller cycle engines, but with improved power density.

By introducing sufficiently small liquid droplets (e.g., having a diameter of up to 5 microns) to the air-flow, the liquid becomes entrained and keeps the charge air cool during the intake stroke. The introduction of the small liquid droplets may increase the total volumetric efficiency, and thus also increase the power density. Although the amount of liquid may be increased to induce wet compression, small amounts of liquid will generally induce improved volumetric efficiency.

At low levels of liquid droplet introduction during the intake stage, the droplets often vaporize before reaching the compression stage. Some droplets may keep the intake air cool as it is heated by the surrounding cylinder 14 walls and piston 12 as well as the remaining exhaust leftover from the previous cycle. By reducing the charge air temperature, more air is likely to enter the cylinder 14, which correspondingly increases the power density. Intake air cooling can improve performance of both compression ignition and spark ignition engines.

Engines generally require higher compression ratios or more advanced ignition timing to increase efficiency. Increasing compression ratio and advancing ignition timing generally increases NOx emissions. Wet compression can lower pre-ignition temperature, therefore lowering peak temperature, and additionally lowering NOx emissions while still providing high compression ratios and ignition timing in a thermodynamically efficient manner without the propensity to knock. Wet compression reduces NOx production in spark ignition as well as compression ignition engines, even at high compression ratios and advanced injection timing.

Wet compression may allow advanced ignition timing, higher brake mean effective pressure (BMEP), lower combustion temperature, and higher compression ratios, each of which may contribute to improved efficiency of the engine 10. Wet compression is capable of reducing pre-combustion temperature and pressure. These pre-combustion effects may be beneficial for knock reduction but can be detrimental to efficiency. Excessive wet compression may lead to significantly lower pre-combustion pressure, such that the combustion process provides a smaller peak pressure, and results in lower efficiency. Wet compression may provide more cooling than pressure reduction, so if the compression ratio is increased to the knock limit, the cycle efficiency will improve.

Engine knock can limit the maximum boost pressure available in the engine 10. This knock limit to boost pressure relation may be applied to engines with stoichiometric air-fuel mixtures. In one embodiment, wet compression suppresses knock by reducing the pre-ignition temperature of the air/fuel mixture. This knock suppression enables higher boost pressures, increasing the power density and BMEP, which tends to increase system efficiency.

Homogeneous charge compression ignition (HCCI) engines operate by compressing the air-fuel mixture such that it auto-ignites near the end of the compression stroke. In such applications, the system operates to time the auto-ignition temperature, which if too early tends to cause the engine to knock heavily and if too late the engine may not fire at all. As the air-fuel mixture conditions change, the auto-ignition temperature also changes. Thus changing power output generally includes a change in the temperature reached at the end of the compression stroke.

In yet another embodiment, wet compression may enable control over the maximum temperature reached during the compression stroke by providing cooling early during compression. In this embodiment, a compression ratio is set to provide HCCI during lean operation. As the air-fuel mixture becomes richer, the auto-ignition temperature is lowered, causing early ignition. Adding small liquid droplets (e.g., having a diameter up to 5 microns) can reduce the temperature rise from compression and delay auto-ignition to the appropriate time. The logic to change the quantity of water added may be dependent upon sensors detecting the combustion conditions of the previous cycle or cycles. In addition to HCCI control, the logic may also control incipient knock in an engine. When the engine 10 power requirement is reduced, micro-droplet production may be reduced, reducing cooling and enabling auto-ignition at the appropriate time.

One aspect of wet compression is an inter-cooling effect during compression. The amount of the inserted liquid droplets may be adjusted to have wet compression only at the beginning of the engine cycle with most of the compression stroke taking place with only gases. Because wet compression may reduce knock, enable higher boost pressures, increase compression ratio, advanced spark timing, etc., an operating condition may be determined by after removing knock limits from their existing optimization routines.

Insulating the combustion chamber in an IC engine is known to improve fuel conversion efficiency by retaining more of the heat in the cylinder during expansion. Cylinder 14 insulation also provides hotter exhaust gases, which increases the potential efficiency gained by combined heat and power systems and bottoming cycles such as turbo-compounding or Rankine cycles to improve total system efficiency. Conversely, the heat retained by the cylinder 14 insulation after combustion contributes to knock in spark ignition engines and higher NOx emissions in both Otto and Diesel cycle engines. Wet compression may alleviate negative effects of cylinder 14 insulation for both Otto cycle and Diesel cycle engines.

Wet compression contributes to the reduction and/or elimination of the ill effects of cylinder 14 insulation by assisting to cool the cylinder gases before compression. Evaporative cooling by wet compression enables high compression ratios by reducing the index of compression, which allows lower temperature rises during compression.

In one embodiment, cylinder 14 insulation may be more effective with wet compression due to a larger relative effect. Additionally, the ill effects of cylinder 14, or piston 12 insulation, specifically increased knock tendency and NOx formation, may be reduced or eliminated. Wet compression may also allow insulation on diesel engines while maintaining low NOx production and high volumetric efficiency.

In one embodiment, the liquid can include a water-ethanol mixture. The high latent heat of the water-ethanol mixture provides the benefits of evaporative cooling and wet compression by finely atomizing the water-ethanol mix in the air assisted injector 110. Generating small liquid droplets having a diameter up to 5 microns can be made easier than with just water partly due to the surface tension reducing qualities of ethanol in water. The benefits of evaporative cooling and wet compression may enable higher compression ratios and reduced engine cooling (via insulated combustion chamber). The high compression ratio and engine 10 insulation contribute to improving efficiency and power density while reducing cold-starting problems generally associated with water-ethanol mixes. In one embodiment of a direct injection engine, high compression ratio and insulated engine design may be used to provide open-throttle power management, further increasing efficiency.

In particular embodiments, un-throttled power output can be controlled by timing the water-ethanol injection into the intake stream 16 or the cylinder 14. Injection during the intake stroke may improve the evaporative cooling effect during intake, and correspondingly increase the engine's 10 volumetric efficiency. Injection after the intake valve closes generally does not provide evaporative cooling during intake, thus a reduced amount of air may enter the cylinder 14. Evaporative cooling and wet compression effects may take place during compression to contribute to the high compression ratio and efficiency.

Wet compression can also allow ignition timing advances, higher knock-free boosting (reducing friction effects on efficiency), and/or reduced combustion temperatures (improving NOx and reducing heat transfer to the cylinder 10 wall). These effects are present when, in one embodiment, re-optimizing the engine 10 utilizes wet compression but does not catastrophically fail without it. The system may be designed such that if the water system fails, the engine 10 may run sub-optimally with turbo-boost reductions and delayed ignition timing, but may not catastrophically fail.

Figure 4:
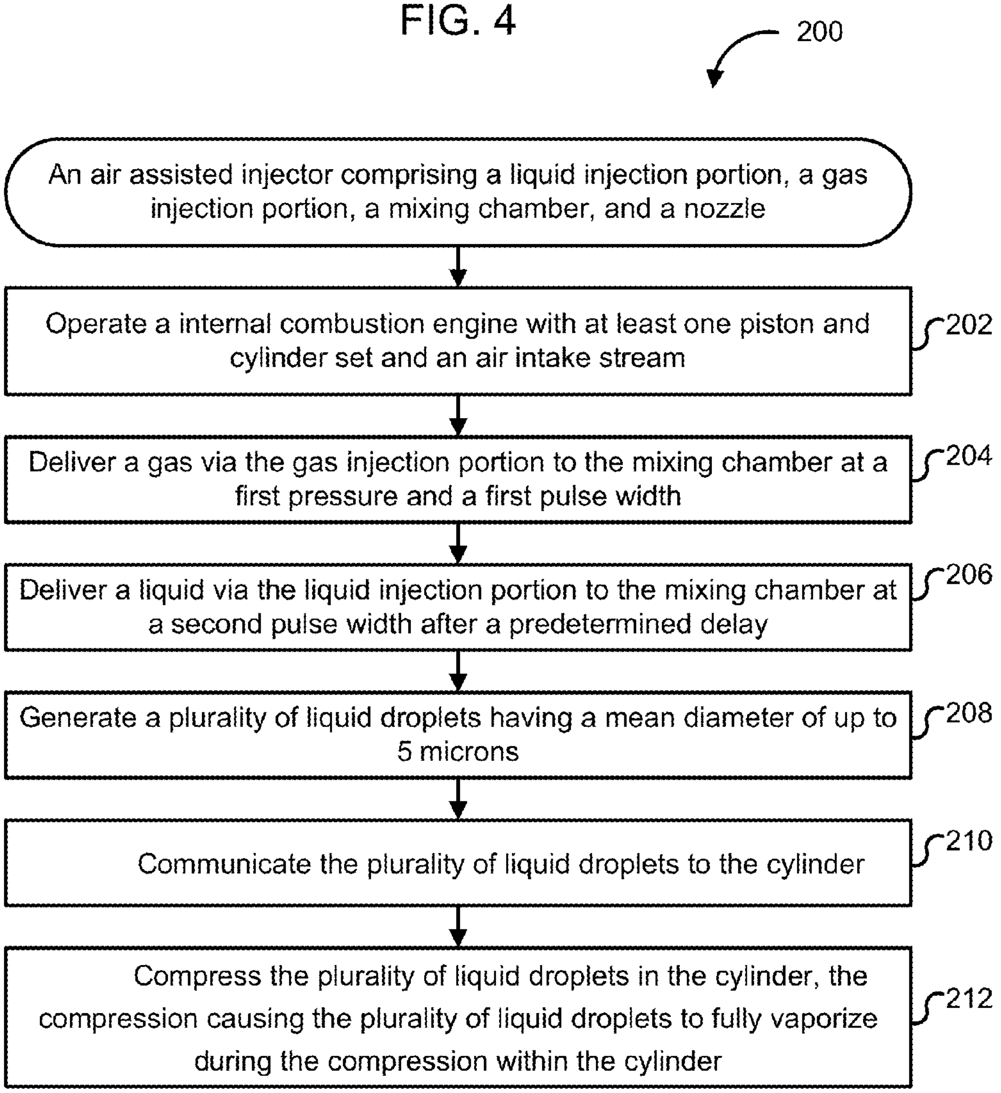
FIG. 4 is a schematic flow diagram of one embodiment of a method of producing liquid droplets having a diameter of up to 5 microns for insertion into a cylinder of an engine using air assisted injection so that the liquid droplets can fully vaporize during a compression stroke of the cylinder.

In some embodiments, a method of generating a plurality of liquid droplets for wet compression in an engine uses an air assisted injector. FIG. 4 shows a schematic flow diagram of an exemplary method 200 for generating liquid droplets for wet compression. The method is operable with an air assisted injector (e.g., the air assisted injector 110) that comprises a liquid injection portion, a gas injection portion, a mixing chamber and a nozzle.

The method 200 comprises operating an IC engine with at least one piston and at least one cylinder, at 202. The engine can include the engine 10 or any other engine described herein. The engine can be a two stroke engine, a four stroke engine, a spark ignition engine (e.g., a gasoline, ethanol, natural gas, propane, liquid petroleum gas, hydrogen or kerosene engine), or a compression ignition engine (e.g., a diesel engine).

A gas is delivered via the gas injection port to the mixing chamber at a first pressure and a first pulse width, at 204. The gas can include any suitable gas, for example, air, oxygen, natural gas, propane, hydrogen or combinations thereof. In particular embodiments, the first pulse width is 10 milliseconds to 25 milliseconds (e.g., 10 milliseconds, 15 milliseconds, 20 milliseconds, or 25 milliseconds, inclusive of all ranges and values therebetween). This correlates to a mass of the gas delivered per pulse width of gas injection portion of 22.5 mg per pulse width (also referred to herein as "shot") to 70.8 mg per pulse width inclusive of all ranges and values therebetween. Furthermore, the first pressure can be in the range of 650 kPa to about 2,000 kPa (e.g., 650 kPa, 700 kPa, 750 kPa, 800 kPa, 850 kPa, 900 kPa, 950 kPa, 1,000 kPa, 1,050 kPa, 1,100 kPa, 1,150 kPa, 1,200 kPa, 1,300 kPa, 1,400 kPa, 1,500 kPa, 1,600 kPa, 1,700 kPa, 1,800 kPa, 1,900 kPa or 2,000 kPa inclusive of all ranges and values therebetween).

A liquid is delivered via the liquid injection portion to the mixing chamber at a second pulse width after a predetermined delay, at 206. The liquid can include water, ethanol, a hydrocarbon (e.g., gasoline, diesel, etc.), a mixture thereof (e.g., a water-ethanol mixture) or any other liquid described herein. In some embodiments, the second pulse width can be in the range of 3.0 milliseconds to 10 milliseconds to deliver a mass of liquid in the range of 25 mg per pulse width to 105 mg per pulse width inclusive of all ranges and values therebetween. In a particular embodiment, the second pulse width is 8.5 milliseconds configured to deliver a mass of liquid in the range of 80 mg per pulse width to 90 mg per pulse width (e.g., 85 mg per pulse width).

In particular embodiments, the predetermined delay can be in the range of 0 milliseconds to 12 milliseconds (e.g., 0 milliseconds, 1 milliseconds, 2 milliseconds, 3 milliseconds, 4 milliseconds, 5 milliseconds, 6 milliseconds, 7 milliseconds, 8 milliseconds, 9 milliseconds, 10 milliseconds, 11 milliseconds or 12 milliseconds, inclusive of all ranges and values therebetween). In another embodiment, the liquid can be heated to temperature of 25 degrees Celsius to 95 degrees Celsius (e.g., about 25 degrees Celsius, 30 degrees Celsius, 40 degrees Celsius, 50 degrees Celsius, 60 degrees Celsius, 70 degrees Celsius, 80 degrees Celsius, or 90 degrees Celsius, inclusive of all ranges and values therebetween) before delivering to the mixing chamber.

In yet another embodiment, the liquid can also include a surfactant such as Triton (e.g., Triton X-100®), ethanol, methanol, glycerols, glucosides, etc. The quantity of the surfactant in the liquid can be in the range of 0.01% to 0.1% by volume.

A plurality of liquid droplets having a mean diameter of up to 5 microns are generated, at 208. Delivering the liquid to mixing chamber after the predetermined delay relative to the gas, and adjusting the first pulse width, first pressure and second pulse width leads to the generation of the liquid droplets which have a mean diameter of up to 5 microns.

The plurality of liquid droplets are communicated to the at least one cylinder, at 210. For example, the air assisted injector can be in fluid communication with an intake stream (e.g., the intake stream 16) of the engine which is configured to deliver an air-fuel mixture to the cylinder (e.g., the cylinder 14 of the engine 10). In other embodiments, the air assisted injector can be disposed on the engine and configured to insert the plurality of liquid droplets directly into the cylinder via the nozzle.

The plurality of liquid droplets are compressed in the cylinder such that the compression causes the plurality of liquid droplets to fully vaporize during the compression within the cylinder, at 212. In other words, the liquid droplets experience a phase change during a compression stroke of the cylinder to inter-cool the cylinder and thereby the engine. In this manner, wet compression of the plurality of liquid droplets is used to provide internal cooling, an increase in power output and efficiency of the engine, as described herein.

In one embodiment, the method 200 can also include determining an amount of the liquid droplets which is to be inserted into the cylinder based on an operating condition of the engine the amount of inserted liquid droplets determined to fully vaporize during the compressing. For example, a controller (e.g., controller 20) can be electrically coupled to the engine and the air assisted injector. The controller can be configured to determine the operating condition of the engine, for example steady-state, high load, low load etc. or any other operating condition of the engine. Based on a particular operating condition, the controller can determine the optimum amount of liquid droplets to be inserted into the cylinder to achieve full vaporization. In this manner, wet compression can be achieved in the engine regardless of the operating condition of the engine such that substantially all of the liquid droplets vaporize during the compression stroke of the cylinder.

Experimental Examples

FIGS. 5-17 show results of experiments performed on the air assisted injector 110 of FIGS. 1-3 to generate a liquid droplets having a mean diameter up to 5 microns. The air assisted injector 110 is configured to produce droplets of greater than 15 microns under normal operating conditions. For example, at an air pressure of 1,200 kPa, a first pulse width of the air of 25 milliseconds and a water temperature of 90 degrees Celsius, the minimum droplet size generated by the air assisted injector measured at a 5 mm insertion depth into a cylinder is 15 microns.

Figure 5:
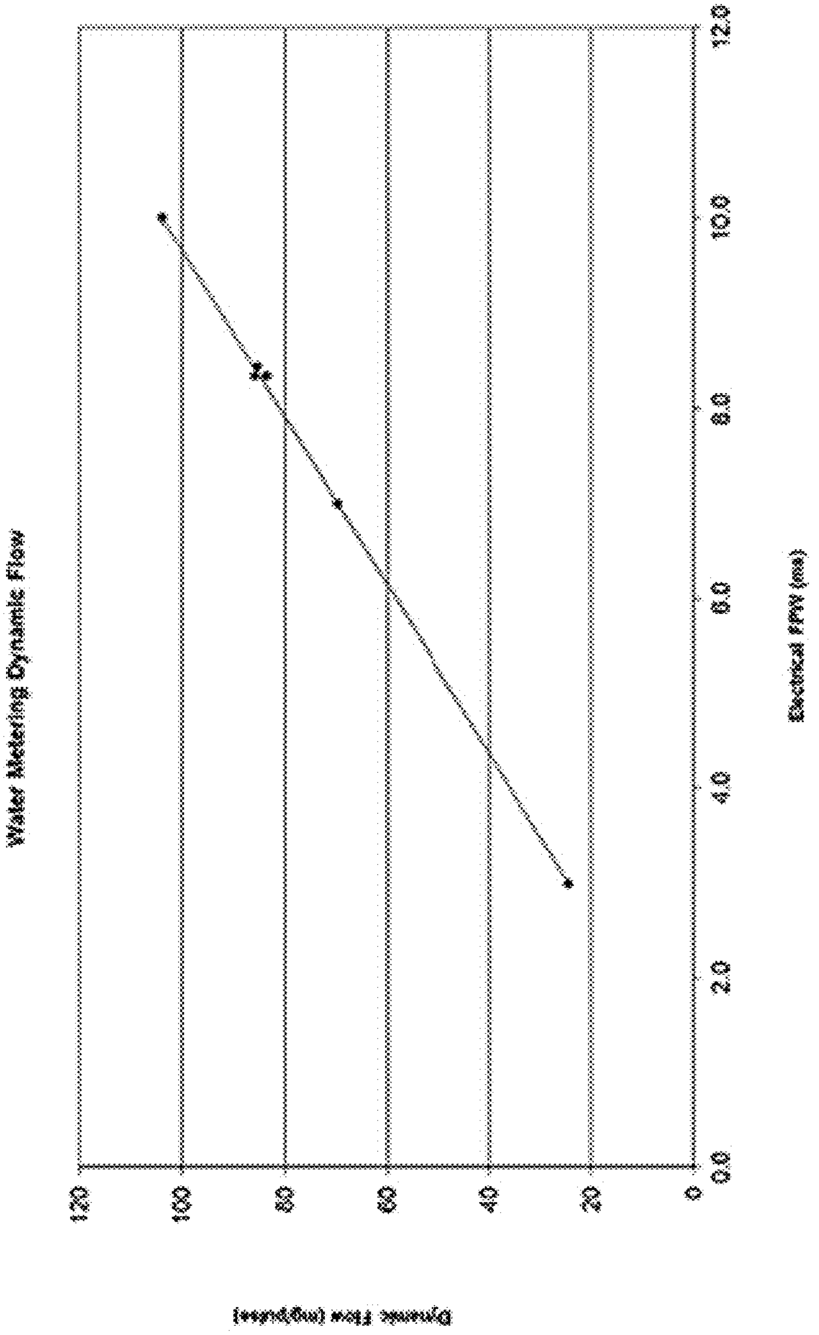
FIG. 5 is a plot of mass flow of water through the air assisted injector of FIG. 2 at various pulse widths.

FIG. 5 is a plot of mass of water per pulse width versus different pulse widths produce by the air assisted injector. The pulse width is varied between 2.5 milliseconds and 10 milliseconds to obtain a mass per pulse width of water in the range of 25 mg to 105 mg. At a pulse width of 8.5 milliseconds, a mass of 85 mg per pulse of the water is delivered.

Figure 6:
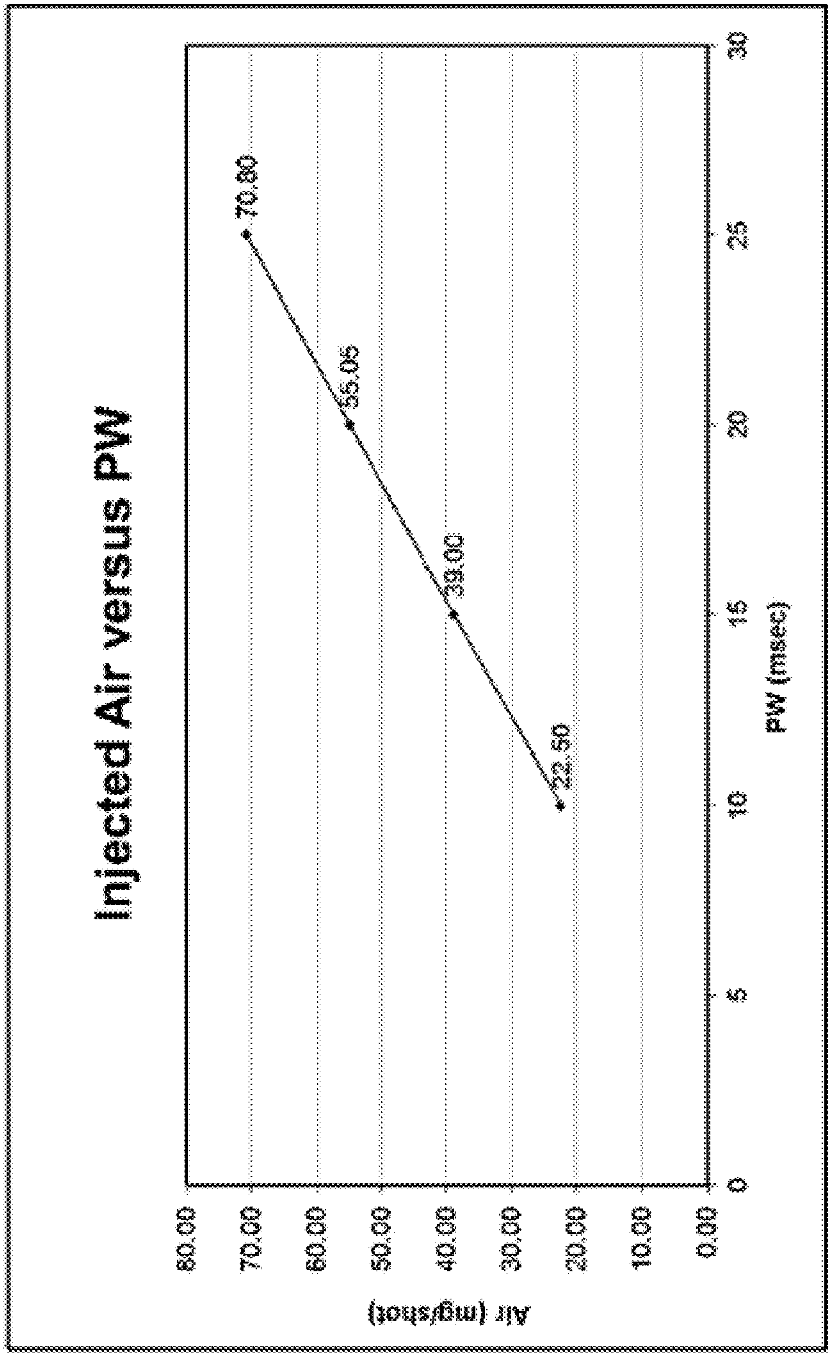
FIG. 6 is a plot of mass flow of air through the air assisted injector of FIG. 2 at various pulse widths.

FIG. 6 is a plot of mass of air delivered at different pulse widths produce by the air assisted injector. The pulse width is varied between 10 milliseconds and 25 milliseconds to obtain a mass per pulse width of the air in the range of 22.5 mg to 70.8 mg.

Figure 7:
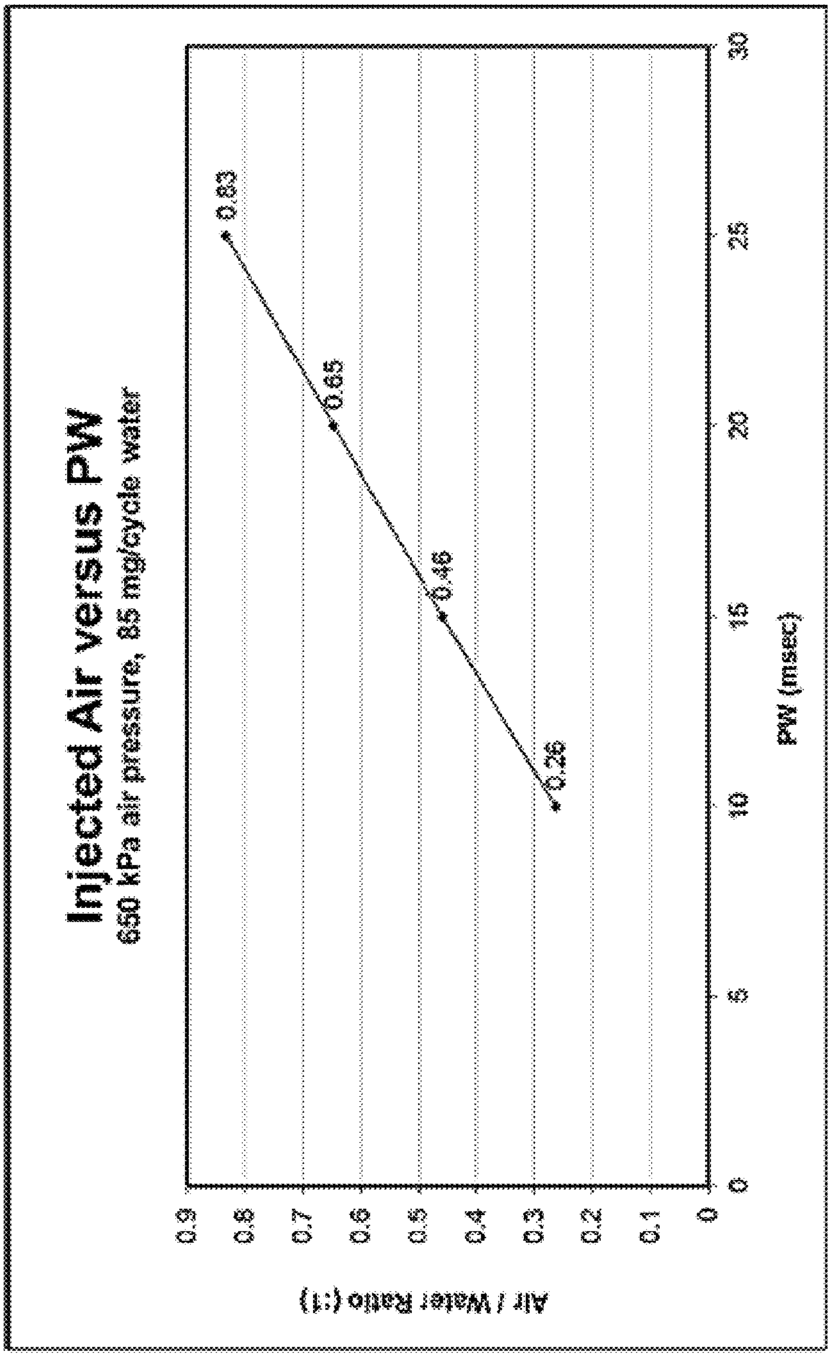
FIG. 7 is plot of air-water ratio delivered by the air assisted injector of FIG. 2 at various pulse widths of air.

FIG. 7 is a plot of air-water ratio at various pulse widths of air. The air pressure is maintained at 650 kPa and the water flow is maintained at 85 mg per pulse width while the air injection pulse width is varied from 10 milliseconds to 25 milliseconds. An air water ratio of 0.26 to 0.83 is observed.

Figure 8:
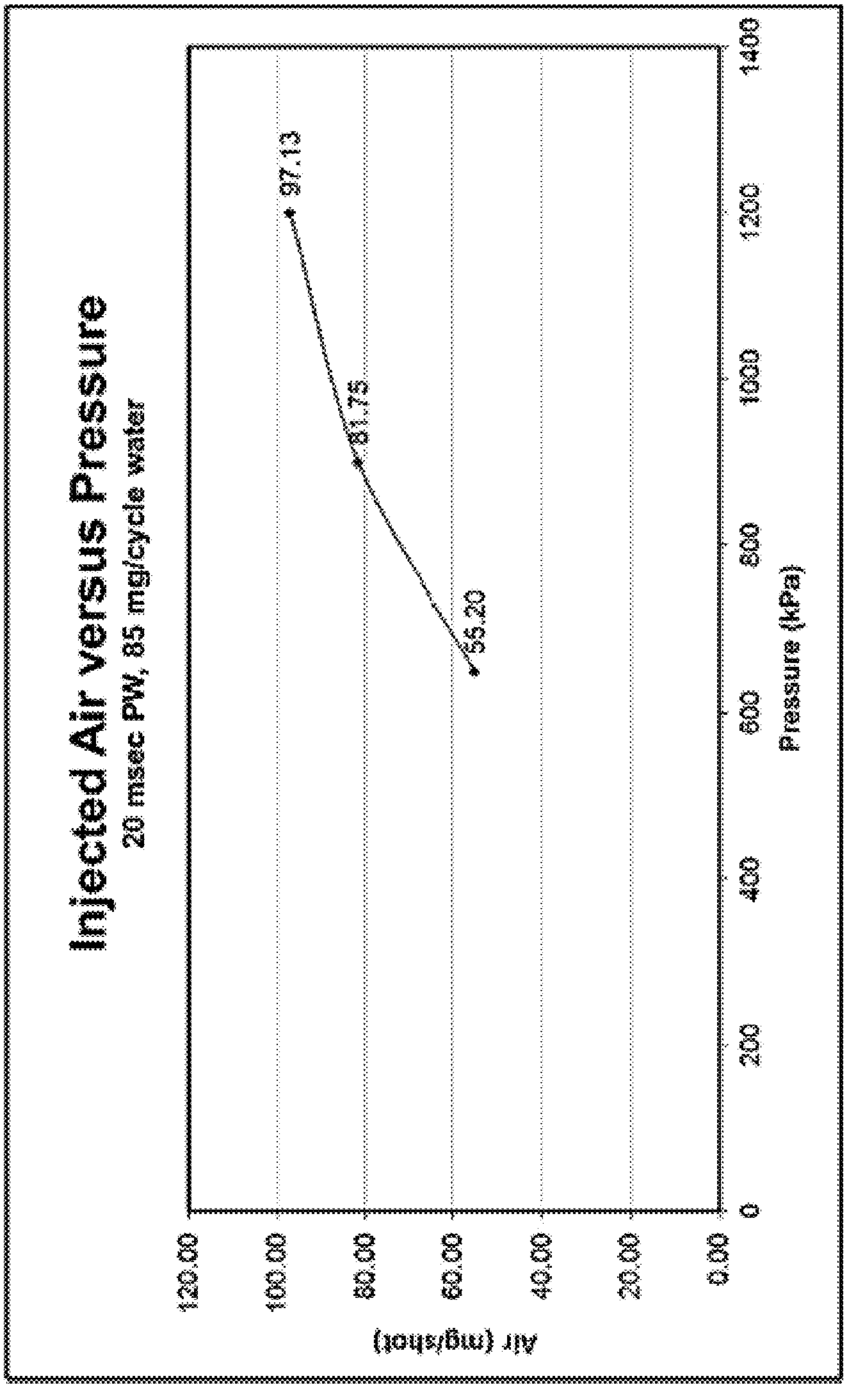
FIG. 8 is a plot of a quantity of air delivered at various pressures by the air assisted injector of FIG. 2 at a pulse width of air of 20 milliseconds.

FIG. 8 is a plot of mass of air per pulse width at different injection pressures. The air injection pulse width was maintained at 20 milliseconds and the water flow is maintained at 85 mg per cycle (i.e., pulse width) while the air pressure is varied between 650 kPa and 1,200 kPa. An air mass flow of 55.20 mg per shot (i.e. pulse width) to 97.13 mg per shot is observed.

Figure 9:
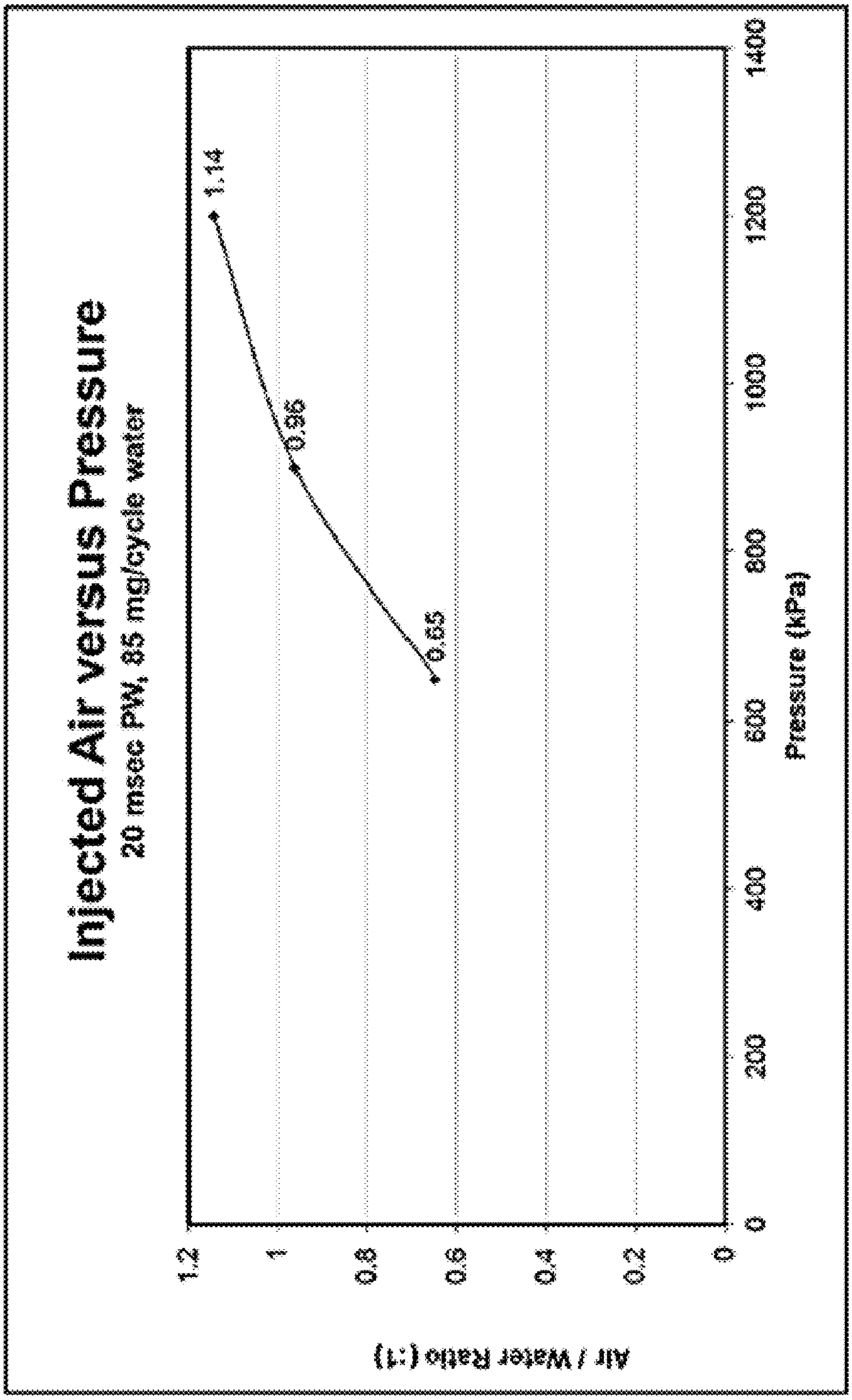
FIG. 9 is a plot of air-water ratio delivered by the air assisted injector of FIG. 2 at various air pressures.

FIG. 9 is the air-water ratio observed for the operating conditions described with respect to FIG. 8. An air water ratio of 0.65 to 1.14 is observed on varying the air pressure from 650 kPa to 1,200 kPa.

Figure 10:
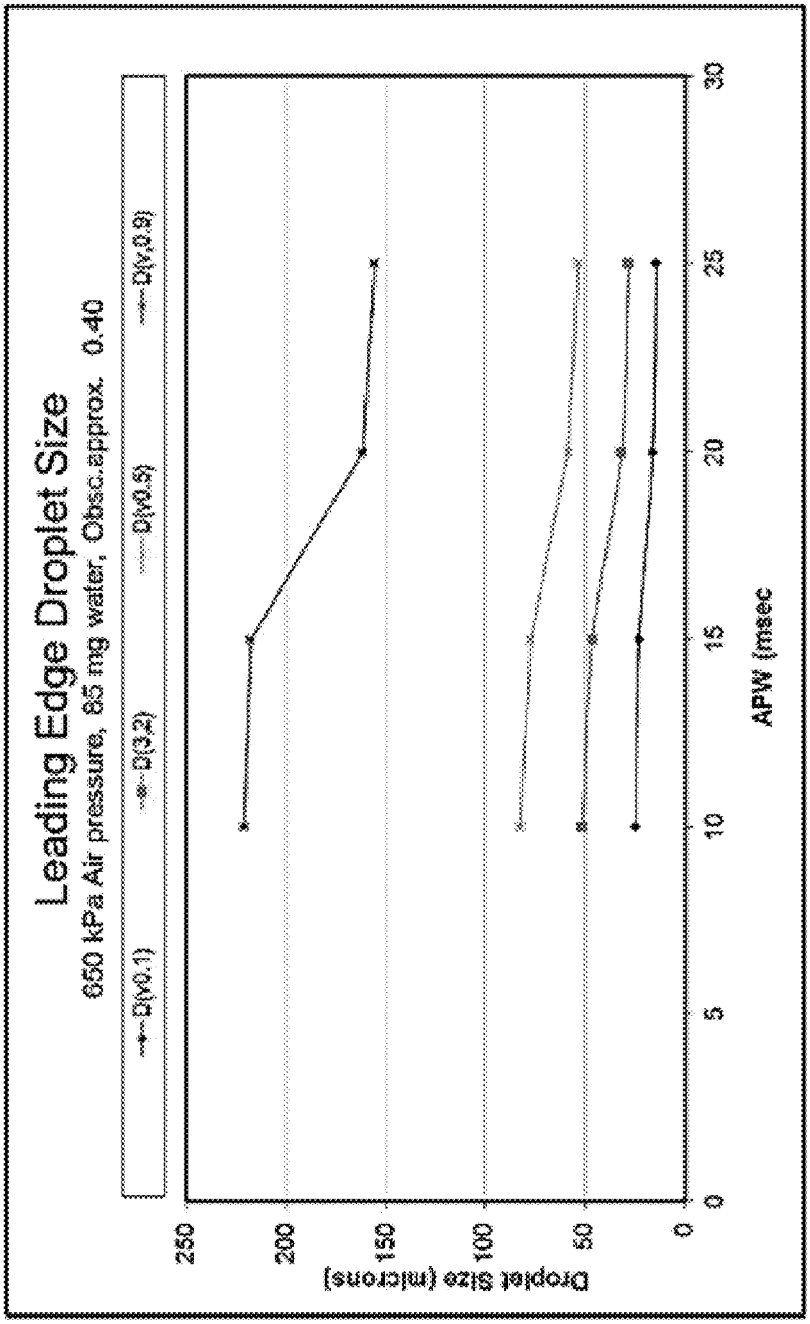
FIG. 10 is a plot of a size of leading edge water droplets delivered by the air assisted injector of FIG. 2 at an air pressure of 650 kPa and 85 milligrams of water delivered per pulse.

FIG. 10 is a plot of leading edge droplet size of water at different pulse widths of the air. The mass flow of water is maintained at 85 mg per pulse width, the air pressure is maintained at 650 kPa and the air pulse width is varied from 10 milliseconds to 25 milliseconds. The leading edge droplet size reduces with increasing air pulse width. Smallest droplet size is observed for the droplet sizes in the $10^{th}$ percentile (D(v,0.1) droplets) but the minimum diameter observed is still greater than 10 microns.

Figure 11:
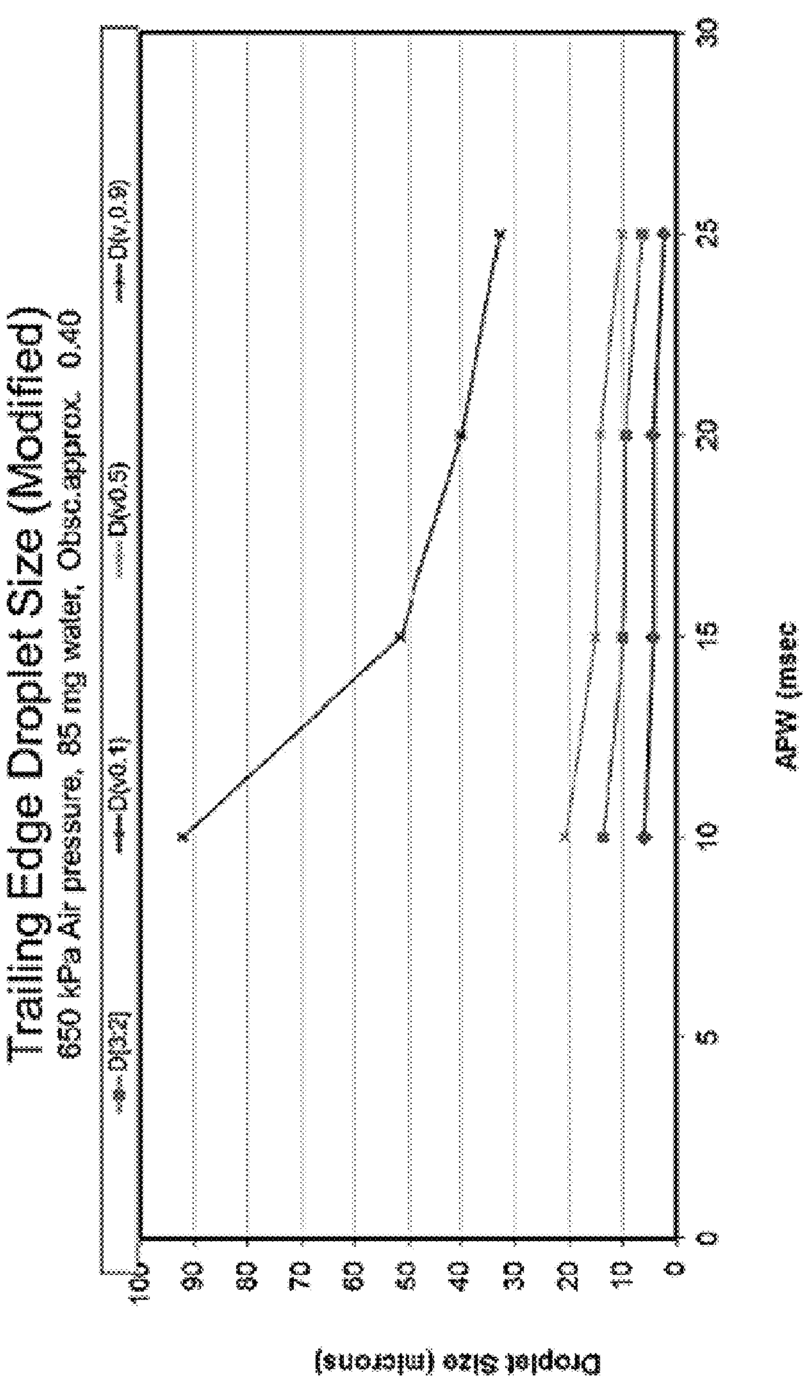
FIG. 11 is a plot of a size of trailing edge water droplets delivered by the air assisted injector of FIG. 2 at an air pressure of 650 kPa and 85 milligrams of water delivered per pulse.

FIG. 11 is a plot of trailing edge droplet size of water at different pulse widths of the air at the operating conditions of FIG. 10. A leading edge droplet size of less than 5 microns was observed at the 25 millisecond air pulse width for the D(v,0.1) droplets.

Figure 12:
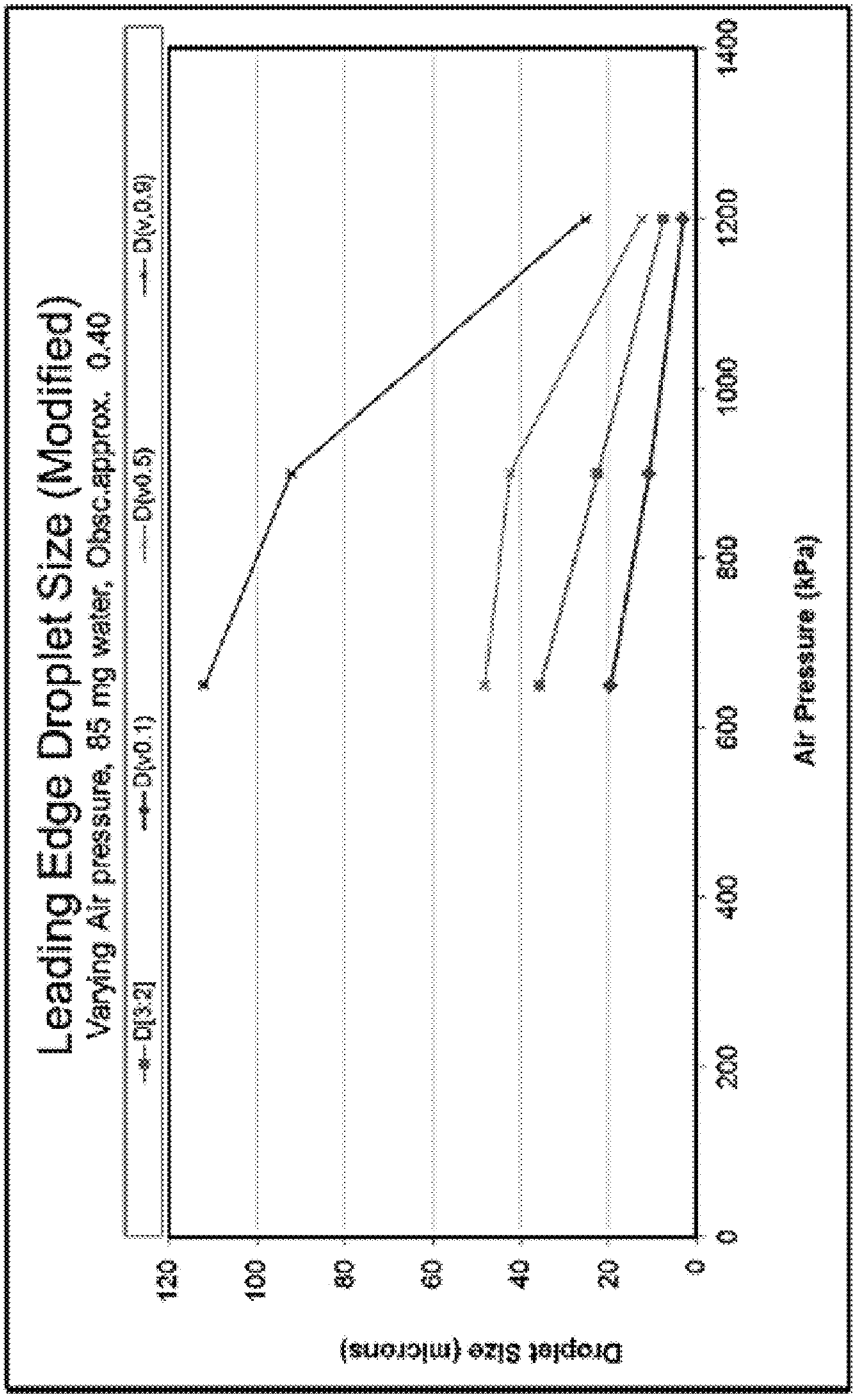
FIG. 12 is a plot of a size of leading edge water droplets delivered by the air assisted injector of FIG. 2 at varying air pressures and 85 milligrams of water delivered per pulse.
Figure 13:
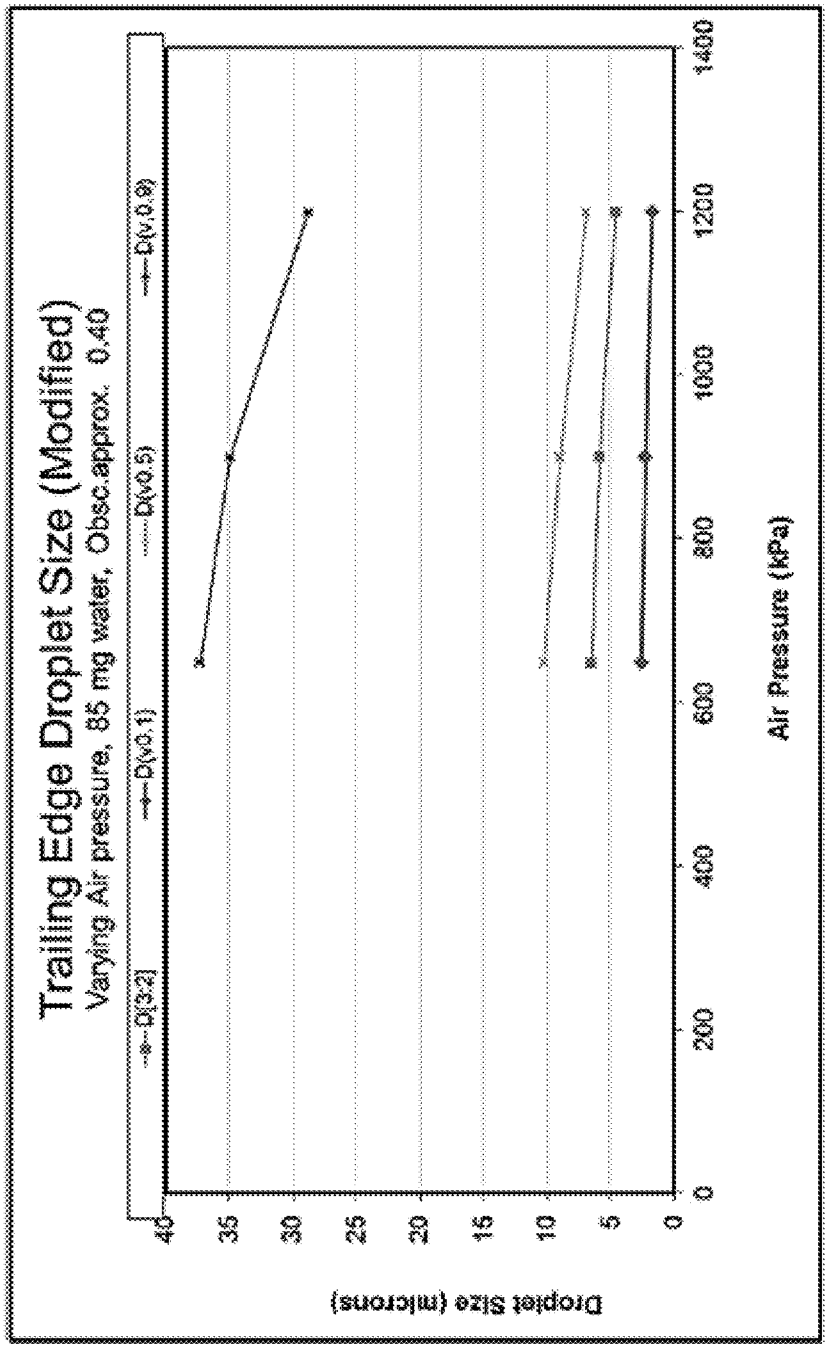
FIG. 13 is a plot of a size of trailing edge water droplets delivered by the air assisted injector of FIG. 2 at varying air pressures and 85 milligrams of water delivered per pulse.

FIG. 12 is a plot of leading edge droplet size and FIG. 13 is a plot of trailing edge droplet size at varying air pressure while maintain the air pulse width at 25 milliseconds and mass flow of water at 85 mg per pulse width. The air pressure was varied from 650 kPa to 1,200 kPa. The D(v,0.1) droplets have a leading edge droplet size as well as a trailing edge droplet size of less than 5 microns for the entire range of air pressure.

In another set of experiments, the water is delivered to the mixing chamber of the air assisted injector after a predetermined delay. The gas injection is initiated and the water is injected into the mixing chamber after a delay of 10 milliseconds. The water flow is 85 milligrams per pulse width, the air pulse width is 25 milliseconds and the air pressure is 1,200 kPa. The observed leading edge droplet sizes and trailing edge droplet sizes which fall in the $10^{th}$ percentile (D(v,0.1)), $50^{th}$ per percentile (D(v,0.5)) and $90^{th}$ percentile (D(v,0.9)), as well as the Sauter mean diameter (D[3,2]) and the volume mean diameter (D[4,3]) with and without the predetermined delay are summarized in Table I.

TABLE I

Reduced leading and Trailing Edge Droplet sized with delayed metering of water

| | Leading Edge Droplet Size (mm) | | Trailing Edge Droplet Size (mm) | |
|---|---|---|---|---|
| | Delay | | | |
| | +1 seconds | −10 seconds | +1 seconds | −10 seconds |
| D[4, 3] | 61.1 | 6.8 | 16.3 | 19.8 |
| D[3, 2] | 35.5 | 3.8 | 6.5 | 7.7 |
| D(v, 0.1) | 19.5 | 1.7 | 2.6 | 3.0 |

TABLE I-continued

Reduced leading and Trailing Edge Droplet sized with delayed metering of water

| | Leading Edge Droplet Size (mm) | | Trailing Edge Droplet Size (mm) | |
|---|---|---|---|---|
| | Delay | | | |
| | +1 seconds | −10 seconds | +1 seconds | −10 seconds |
| D(v, 0.5) | 48.3 | 4.7 | 10.2 | 12.4 |
| D(v, 0.9) | 111.8 | 14.1 | 37.3 | 45.3 |

Figure 14:
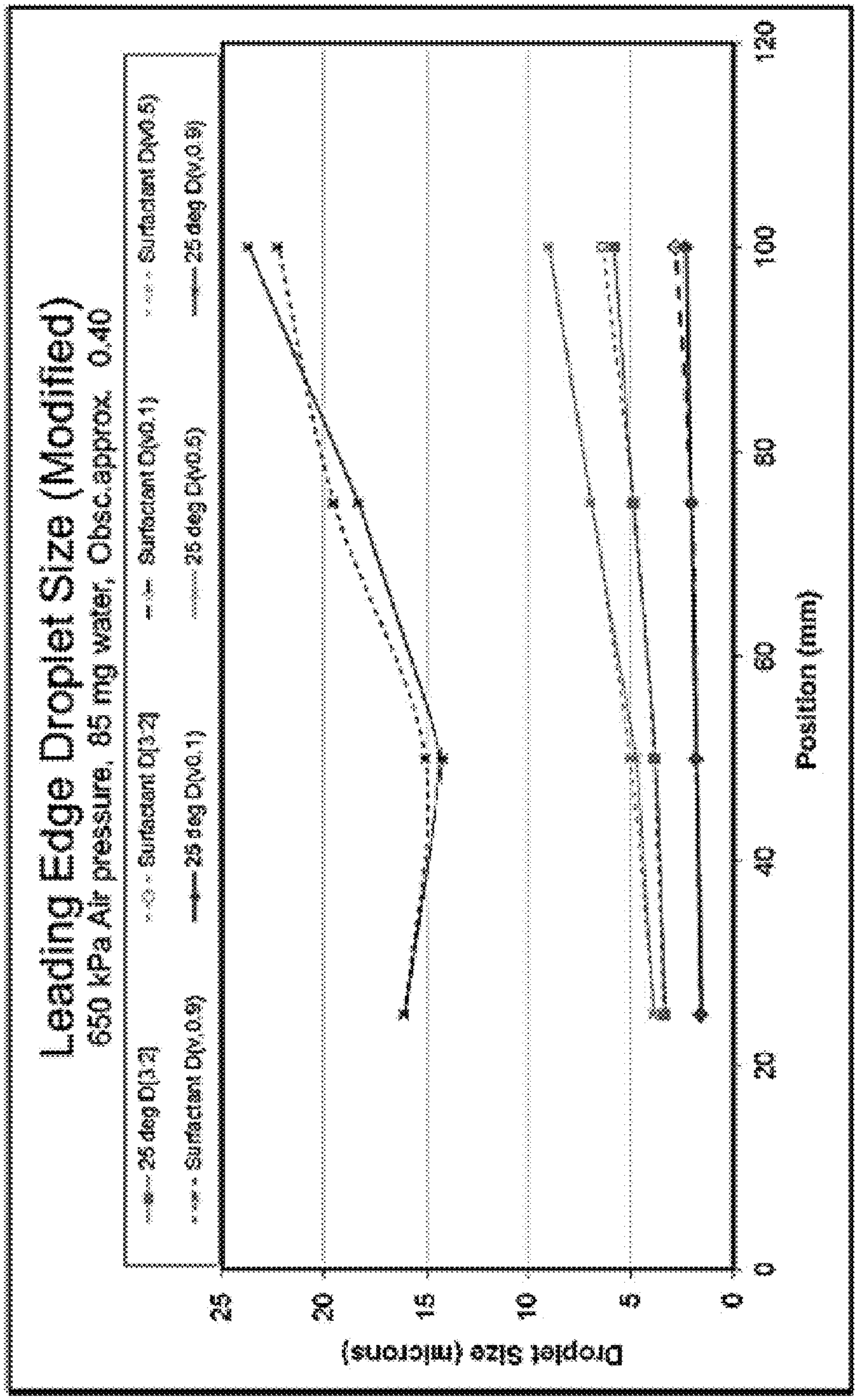
FIG. 14 is a plot of a size of leading edge water droplets delivered by the air assisted injector of FIG. 2 at various positions and 85 milligrams of water delivered per pulse and at 25 degrees Celsius, including or excluding a surfactant.
Figure 15:
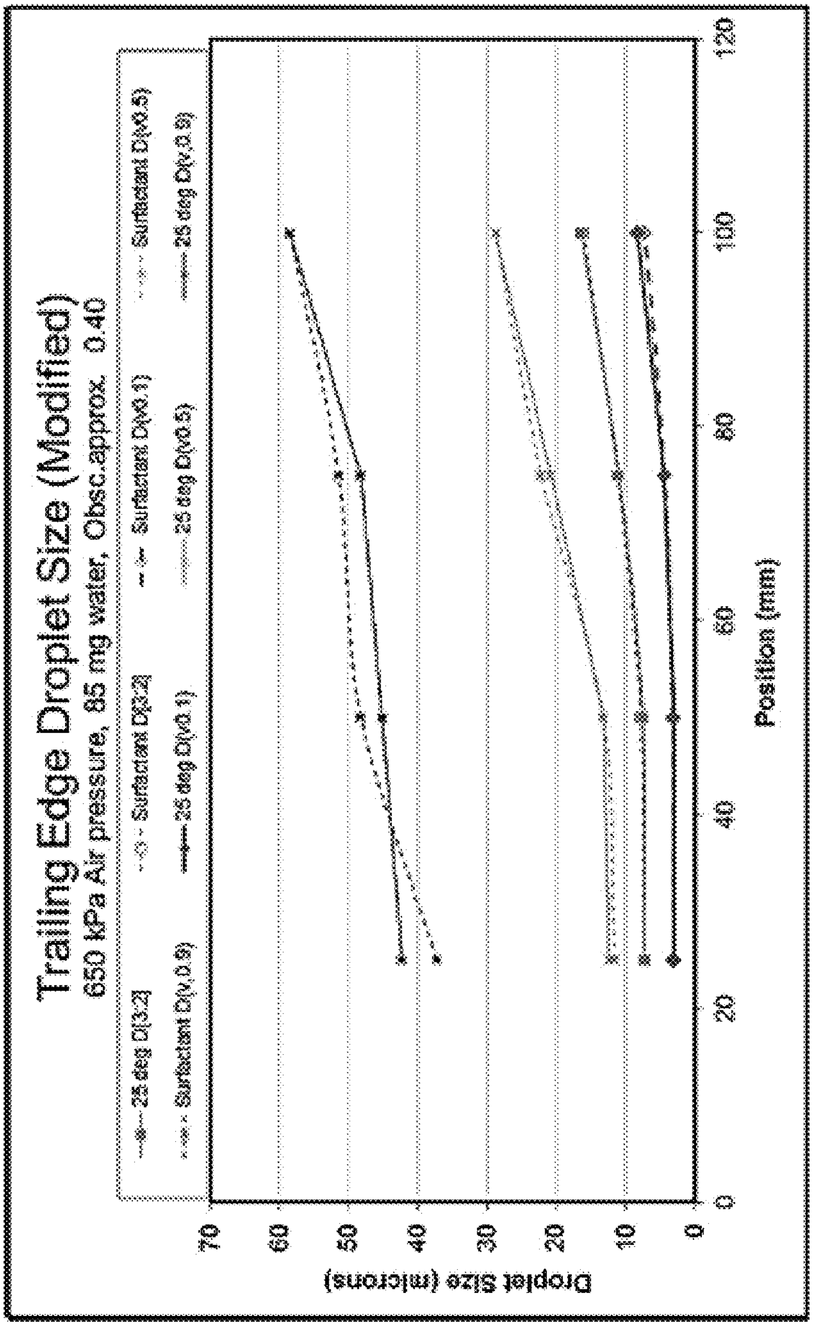
FIG. 15 is a plot of a size of trailing edge water droplets delivered by the air assisted injector of FIG. 2 at various positions and 85 milligrams of water delivered per pulse and at 25 degrees Celsius, including or excluding a surfactant.

FIGS. 14 and 15 are plots of leading edge droplet size and trailing edge droplet size, respectively of water droplets that include 0.02% by volume of a surfactant, measured at different positions within the cylinder. Each position is measured from the insertion point of the droplets into the cylinder. The air was injected into the mixing chamber at a pressure of 650 kPa, while the water was maintained at 85 mg per pulse width. The temperature of the injected water was maintained at 25 degrees Celsius. A slight reduction in diameter of droplets was obtained by adding the surfactant to water.

Figure 16:
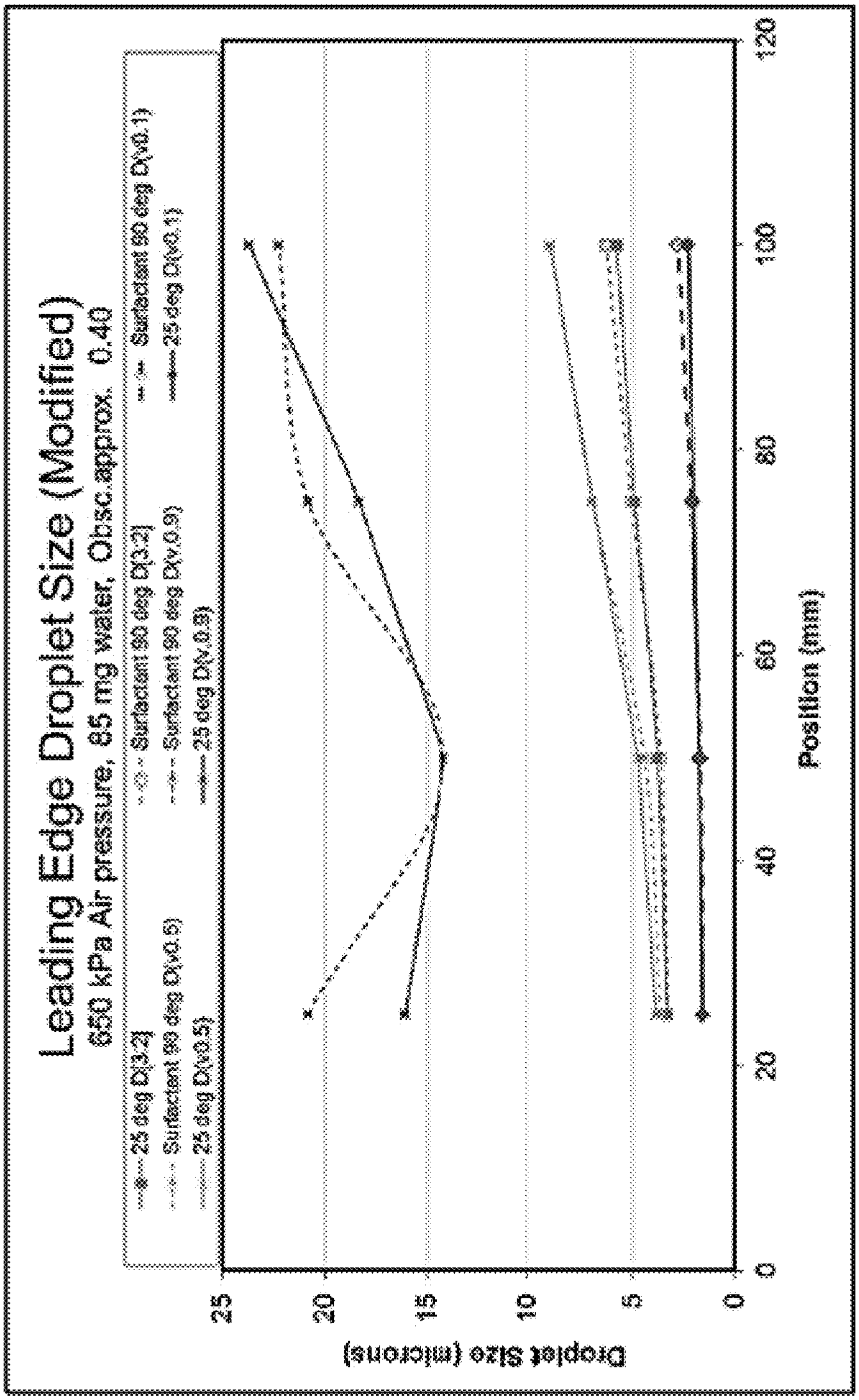
FIG. 16 is a plot of a size of leading edge water droplets delivered by the air assisted injector of FIG. 2 at various positions and 85 milligrams of water delivered per pulse and at 25 degrees Celsius or 90 degrees Celsius, including or excluding a surfactant.
Figure 17:
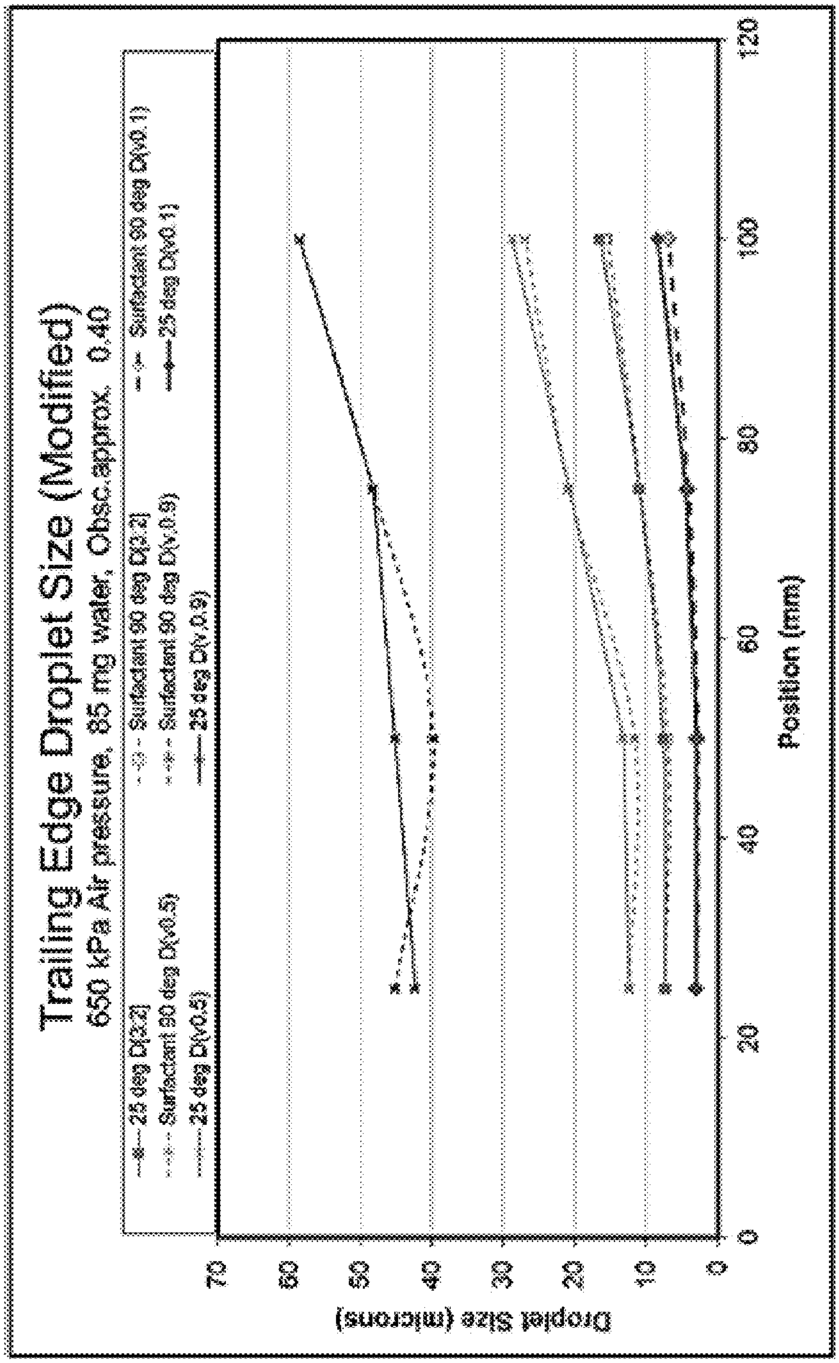
FIG. 17 is a plot of a size of trailing edge water droplets delivered by the air assisted injector of FIG. 2 at various positions and 85 milligrams of water delivered per pulse and at 25 degrees Celsius or 90 degrees Celsius, including or excluding a surfactant.

FIGS. 16 and 17 are plots of leading edge droplet size and trailing edge droplet size, respectively of water droplets that include 0.02% by volume of a surfactant with the water heated to a temperature of 90 degrees Celsius, measured at different positions within the cylinder. Each position is measured from the insertion point of the droplets into the cylinder. The air was injected into the mixing chamber at a pressure of 650 kPa, while the water was maintained at 85 mg per pulse width. A slight reduction in diameter of droplets was obtained by heating the water to 90 degrees Celsius.

The experiment of FIGS. 16 and 17 was repeated with the air pressure maintained at 1,200 kPa. The observed leading edge droplet size and trailing edge droplet size produced using water including 0.02% by volume surfactant and heated to a temperature of 90 degrees Celsius, generated at air pulse widths of 20 milliseconds and 25 milliseconds is summarized in Table II.

TABLE II

Reduced leading and Trailing Edge Droplet sized producing at an air pressure of 1,200 kPa, air pulse width of 20 millisecond or 25 millisecond, water including 0.02% by volume surfactant and maintained at 90 degrees Celsius

| | Leading Edge Droplet Size (mm) | | Trailing Edge Droplet Size (mm) | |
|---|---|---|---|---|
| | Air Pulse Width | | | |
| | 20 millisecs | 25 millisecs | 20 millisecs | 25 millisecs |
| D[4, 3] | 5.0 | 4.5 | 9.8 | 8.4 |
| D[3, 2] | 3.0 | 2.7 | 4.4 | 3.8 |
| D(v, 0.1) | 1.5 | 1.5 | 1.8 | 1.7 |
| D(v, 0.5) | 3.2 | 2.8 | 6.5 | 5.4 |
| D(v, 0.9) | 10.9 | 9.6 | 22.2 | 19.5 |

As used herein, the singular forms “a”, “an” and “the” include plural referents unless the context clearly dictates otherwise. Thus, for example, the term “a member” is intended to mean a single member or a combination of members, “a material” is intended to mean one or more materials, or a combination thereof.

As used herein, the terms “about” and “approximately” generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

What is claimed is:

1. An apparatus comprising:

an internal combustion engine including an intake stream, at least one piston and at least one cylinder;

an air assisted injector configured to insert a plurality of liquid droplets into at least one of the intake stream and the cylinder of the engine, the air assisted injector comprising:

a gas injection portion configured to deliver a gas to a mixing chamber included in the air assisted injector at a first pressure and a first pulse width;

a liquid injection portion configured to deliver a cooling liquid to the mixing chamber at a first temperature and a second pulse width, the cooling liquid delivered to the mixing chamber after a predetermined delay relative to the gas so as to generate the plurality of liquid droplets having a mean diameter of up to 5 microns; and a nozzle configured to deliver the plurality of liquid droplets to at least one of the intake stream or the cylinder, wherein the gas and the inserted liquid droplets are compressed during a compression stroke in the at least one cylinder, the compression causing the inserted liquid droplets to fully vaporize throughout the compression stroke in the at least one cylinder, and wherein the inserted liquid droplets provide cooling to the at least one cylinder.

2. The apparatus of claim 1, wherein the first temperature is in the range of 25 degrees Celsius to 90 degrees Celsius.

3. The apparatus of claim 1, wherein the cooling liquid is at least one of water, ethanol, or a hydrocarbon.

4. The apparatus of claim 1, wherein the second pulse width is 8.5 milliseconds, the second pulse width configured to deliver in the range of 80 mg/pulse to 90 mg/pulse of the liquid.

5. The apparatus of claim 1, wherein the gas is a gaseous fuel.

6. The apparatus of claim 5, wherein the gas is one of air, hydrogen and natural gas.

7. The apparatus of claim 1, wherein the first pressure is in the range of 650 kPa to 2,000 kPa.

8. The apparatus of claim 1, wherein the first pulse width is 10 milliseconds to 25 milliseconds.

9. The apparatus of claim 1, wherein the predetermined delay is 0 milliseconds to 12 milliseconds.

10. The apparatus of claim 1, wherein a ratio of the gas to the liquid is in the range of 0.25 to 2.5.

11. An apparatus comprising:

an internal combustion engine including an intake stream, at least one piston and at least one cylinder;

an air assisted injector configured to insert a plurality of liquid droplets into at least one of an intake stream or the cylinder of the engine, the air assisted injector comprising:

a gas injection portion configured to deliver a gas to a mixing chamber included in the air assisted injector at a first pressure and a first pulse width, wherein the first pressure is in the range of 650 kPa to 2,000 kPa;

a liquid injection portion configured to deliver a cooling liquid to the mixing chamber at a first temperature and a second pulse width, the cooling liquid delivered to the mixing chamber after a predetermined delay relative to the gas to generate the plurality of liquid droplets having a mean diameter of up to 5 microns; and a nozzle configured to deliver the plurality of liquid droplets to at least one of the intake stream or the cylinder, wherein the gas and the inserted liquid droplets are compressed during a compression stroke in the at least one cylinder; and a controller electrically coupled to at least one of the air assisted injector or the engine, wherein the controller is configured to determine an amount of the liquid droplets which is to be inserted into the cylinder based on an operating condition of the engine, the amount of inserted liquid droplets determined to fully vaporize throughout the compression stroke of the at least one cylinder, and wherein the inserted liquid droplets provide cooling to the at least one cylinder.

12. The apparatus of claim 11, wherein the first pulse width is 8.5 milliseconds, the first pulse width configured to deliver in the range of 80 mg/pulse to 90 mg/pulse of the liquid.

13. The apparatus of claim 11, wherein the second pulse width is 10 milliseconds to 25 milliseconds.

14. The apparatus of claim 11, wherein the predetermined delay is 8 milliseconds to 12 milliseconds.

15. The apparatus of claim 11, wherein a ratio of the gas to the cooling liquid is in the range of 0.25 to 0.85.

16. The apparatus of claim 11, wherein the air assisted injector is fluidly coupled to the combustion chamber of the at least one cylinder.

17. A method of generating liquid droplets for wet compression in an engine using an air assisted injector comprising a liquid injection portion, a gas injection portion, a mixing chamber, and a nozzle, the method comprising:

operating an internal combustion engine which includes at least one piston and at least one cylinder;

delivering a gas via the gas injection portion to the mixing chamber at a first pressure and a first pulse width;

delivering a cooling liquid via the liquid injection portion to the mixing chamber at a second pulse width after a predetermined delay;

generating a plurality of liquid droplets having a mean diameter of up to 5 microns from the cooling liquid;

communicating the plurality of liquid droplets to the at least one cylinder; and compressing the plurality of liquid droplets in the cylinder, the compressing causing the liquid droplets to fully vaporize during the compressing within the cylinder, wherein the plurality of liquid droplets provide cooling to the at least one cylinder.

18. The method of claim 17, further comprising:

determining an amount of the liquid droplets which is to be inserted into the cylinder based on an operating condition of the engine, the amount of inserted liquid droplets determined to fully vaporize during the compressing.

19. The method of claim 17, further comprising:

heating the cooling liquid to temperature of 25 degrees Celsius to 95 degrees Celsius before delivering to the mixing chamber.

20. The method of claim 17, wherein the first pulse width is about 8.5 milliseconds, the first pulse width configured to deliver in the range of 80 mg/pulse to 90 mg/pulse of the liquid.

21. The method of claim 17, wherein the first pressure is in the range of 650 kPa to 1,200 kPa.

22. The method of claim 17, wherein the second pulse width is 10 milliseconds to 25 milliseconds.

23. The method of claim 17, wherein the predetermined delay is 8 milliseconds to 12 milliseconds.

24. The method of claim 17, wherein the cooling liquid includes a surfactant.

25. The method of claim 17, wherein a quantity of the surfactant in the cooling liquid is in the range of 0.01% to 0.1% by volume.

* * * * *